(12) United States Patent
Taylor et al.

(10) Patent No.: US 11,204,737 B2
(45) Date of Patent: Dec. 21, 2021

(54) PLAYBACK QUEUES FOR SHARED EXPERIENCES

(71) Applicant: Sonos, Inc., Santa Barbara, CA (US)

(72) Inventors: Ryan Taylor, Santa Barbara, CA (US); Jeffrey Michael Torgerson, Stanwood, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/680,234

(22) Filed: Nov. 11, 2019

(65) Prior Publication Data

US 2021/0141589 A1 May 13, 2021

(51) Int. Cl.
*G06F 3/16* (2006.01)
*H04L 29/06* (2006.01)
*H04R 27/00* (2006.01)

(52) U.S. Cl.
CPC .......... *G06F 3/165* (2013.01); *H04L 65/1066* (2013.01); *H04L 65/1069* (2013.01); *H04L 65/1089* (2013.01); *H04L 65/4084* (2013.01); *H04L 65/80* (2013.01); *H04R 27/00* (2013.01); *H04R 2227/003* (2013.01)

(58) Field of Classification Search
CPC . G06F 3/165; H04L 65/1069; H04L 65/4084; H04L 65/80; H04L 65/1089; H04L 65/1066; H04R 27/00; H04R 2227/003
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |

(Continued)

FOREIGN PATENT DOCUMENTS

| EP | 1389853 A1 | 2/2004 |
| WO | 200153994 | 7/2001 |

(Continued)

OTHER PUBLICATIONS

AudioTron Quick Start Guide, Version 1.0, Mar. 2001, 24 pages.
(Continued)

*Primary Examiner* — Patrice L Winder

(57) ABSTRACT

A first playback device, while operating in a first media playback system, receives from a computing device over a WAN an indication that a second playback device operating in a second media playback system has initiated sharing of a playback session. The first playback device transmits a request to join the playback session, and then receives, from the computing device over the WAN, playback session information including indications of (i) one or more media items in a queue designated for playback by the second playback device and (ii) a playback position of the second playback device within the one or more media items. The first playback device retrieves, from a media service, the one or more media items in the queue designated for playback by the second playback device. The first playback device then plays back the one or more media items beginning at the playback position.

18 Claims, 17 Drawing Sheets

(56) References Cited

U.S. PATENT DOCUMENTS

| | | | |
|---|---|---|---|
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang et al. | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,392,583 B2 * | 3/2013 | Bijwaard | H04L 65/4076 709/227 |
| 8,483,853 B1 | 7/2013 | Lambourne | |
| 8,701,204 B2 * | 4/2014 | Carr | G06F 21/6218 726/26 |
| 8,942,252 B2 | 1/2015 | Balassanian et al. | |
| 8,959,085 B2 * | 2/2015 | Fisher | G06F 16/43 707/726 |
| 9,318,152 B2 * | 4/2016 | Kretz | H04L 67/14 |
| 9,326,070 B2 | 4/2016 | Bender et al. | |
| 9,374,682 B2 * | 6/2016 | Weng | H04L 12/1818 |
| 9,442,626 B2 * | 9/2016 | Schupak | G06F 16/68 |
| 9,467,322 B2 * | 10/2016 | Dietrich | H04L 65/607 |
| 9,549,010 B2 * | 1/2017 | Samuell | H04L 65/4084 |
| 9,729,599 B2 * | 8/2017 | Beckhardt | H04L 67/325 |
| 9,882,945 B2 * | 1/2018 | Frankel | H04L 65/4084 |
| 9,930,470 B2 | 3/2018 | Reilly et al. | |
| 10,057,662 B2 * | 8/2018 | Talukder | H04L 65/1089 |
| 10,063,600 B1 | 8/2018 | Marsh et al. | |
| 10,095,469 B2 | 10/2018 | Reimann et al. | |
| 10,134,059 B2 | 11/2018 | Mishra et al. | |
| 10,154,122 B1 | 12/2018 | Coburn, IV et al. | |
| 10,268,357 B2 | 4/2019 | Mega et al. | |
| 10,389,782 B2 * | 8/2019 | Alsina | G06F 16/685 |
| 10,409,546 B2 | 9/2019 | Zalon et al. | |
| 10,423,382 B2 * | 9/2019 | De Angelis | H04L 67/06 |
| 10,433,057 B2 * | 10/2019 | Banerjee | H04J 3/0641 |
| 10,447,803 B2 * | 10/2019 | Wilde | H04L 63/101 |
| 10,509,558 B2 | 12/2019 | Chen et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0152226 A1 | 8/2003 | Candelore et al. | |
| 2003/0157951 A1 | 8/2003 | Hasty | |
| 2004/0024478 A1 | 2/2004 | Hans et al. | |
| 2007/0142944 A1 | 6/2007 | Goldberg et al. | |
| 2008/0040283 A1 * | 2/2008 | Morris | G06F 21/10 705/59 |
| 2009/0164902 A1 * | 6/2009 | Cohen | H04L 65/604 715/716 |
| 2013/0218942 A1 | 8/2013 | Willis et al. | |
| 2014/0093114 A1 | 4/2014 | Nguyen et al. | |
| 2014/0245346 A1 | 8/2014 | Cheng et al. | |
| 2015/0278322 A1 | 10/2015 | Beckhardt | |
| 2015/0324552 A1 | 11/2015 | Beckhardt | |
| 2015/0355879 A1 | 12/2015 | Beckhardt et al. | |
| 2016/0352797 A1 | 12/2016 | Marus et al. | |
| 2017/0242653 A1 | 8/2017 | Lang et al. | |
| 2017/0289202 A1 * | 10/2017 | Krasadakis | H04L 65/1069 |
| 2018/0352017 A1 | 12/2018 | Schneider et al. | |
| 2019/0138573 A1 | 5/2019 | Land et al. | |
| 2019/0155840 A1 | 5/2019 | O'Konski et al. | |
| 2019/0279260 A1 | 9/2019 | Carpita et al. | |
| 2020/0007926 A1 | 1/2020 | Tang et al. | |

FOREIGN PATENT DOCUMENTS

| | | | |
|---|---|---|---|
| WO | 2003093950 A2 | 11/2003 | |
| WO | WO 2019137897 A1 * | 7/2019 | H04L 65/1069 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Search Report and Written Opinion dated Feb. 5, 2021, issued in connection with International Application No. PCT/US2020/059994, filed on Nov. 11, 2020, 20 pages.
International Bureau, International Search Report and Written Opinion dated Jul. 14, 2021, issued in connection with International Application No. PCT/US2021/028205, filed on Apr. 20, 2021, 10 pages.
Notice of Allowance dated Sep. 7, 2021, issued in connection with U.S. Appl. No. 17/235,704, filed Apr. 20, 2021, 13 pages.

* cited by examiner

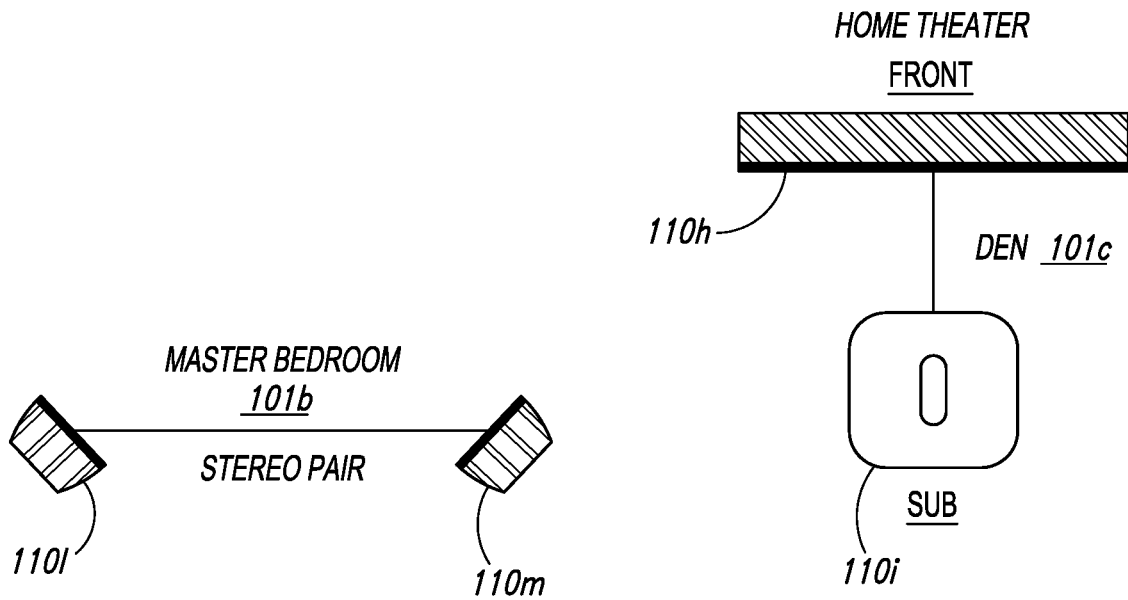
Fig. 1I
Fig. 1J
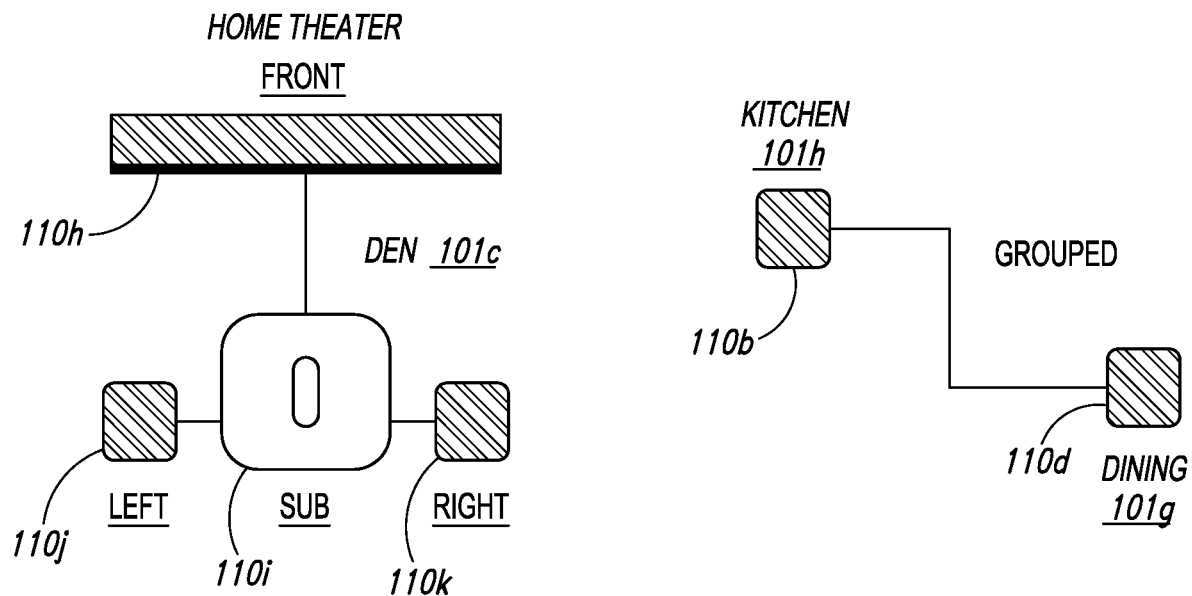
Fig. 1K
Fig. 1L

PLAYBACK QUEUES FOR SHARED EXPERIENCES

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIGS. 1-I through 1L are schematic diagrams of corresponding media playback system zones.

Figure 1A:
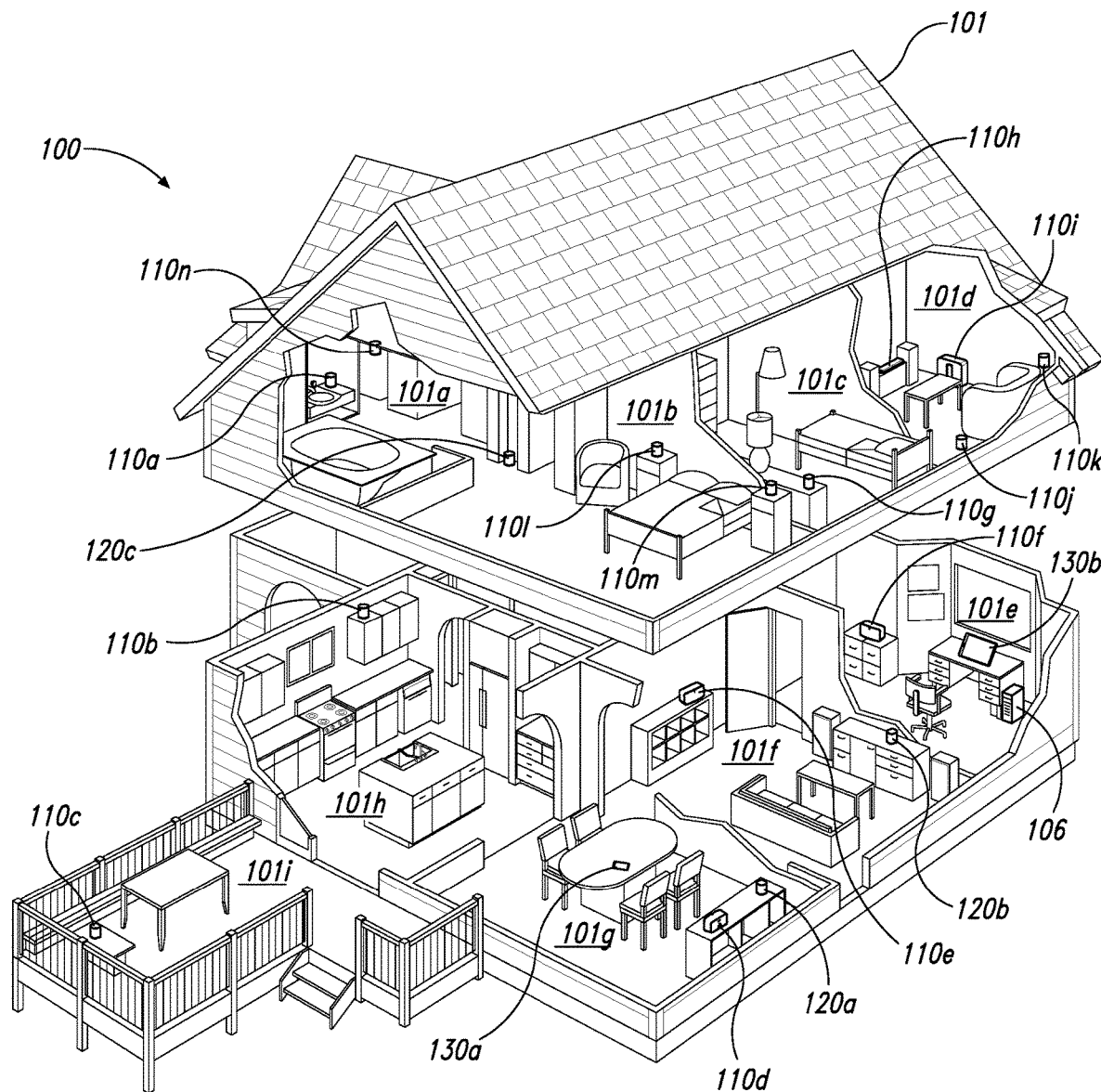
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to creating and facilitating a shared playback session between playback devices in separate media playback systems. A first playback device (or group of playback devices) that is playing back media items from a playback queue may initiate sharing of a playback session, which may cause indications of the one or more media items and a playback position within the one or more media items to be sent to a computing device. A second playback device (or one or more groups of playback devices) may join the playback session by requesting and then receiving, from the computing device, an indication of the one or more media items and the playback position. In some cases, the shared playback session may facilitate additional interactions between users of the participating playback devices.

In conventional internet radio programming, playback devices in different media playback systems may stream media content according to a fixed, linear programming schedule that is dictated by the internet radio station provider. In contrast, examples discussed herein involve a first listener of a first playback device playing back media items of their own selection, as well as managing and updating an associated playback queue of those media items during playback. Meanwhile, other listeners of other playback devices located in other media playback systems (e.g., other households), receive and play back the same media items in substantial synchrony with the first playback device, and will experience any changes made by the first listener. For example, embodiments herein may allow for friends who are in different locations to listen to a particular playlist of media items in substantial synchrony. Similarly, the examples discussed herein might allow for celebrities, influencers, and other personalities to host playback sessions that other listeners can "tune-in" to in relative real time.

For example, the first listener may create a playback queue of media items for playback by the first playback device in a first media playback system. The playback queue may be stored locally on the first playback device and/or remotely from the first playback device on a control device of the first media playback system, and/or a cloud-based server, among other examples. The first playback device may then execute a command from the first listener to initiate sharing of a playback session, such as a button press or a voice command. In response, the first playback device sends an indication of one or more media items from the playback queue to a computing device that will facilitate the shared playback session, such as a cloud-based server operated by a provider of the first media playback system, e.g., Sonos. In some implementations, the first playback device may send an indication of all media items in the playback queue. Alternatively, the first playback device may send an indication of one or two media items at a time, and then send further indications of upcoming media items as playback progresses. Other examples are also possible.

The first playback device also transmits to the computing device a playback position of the first playback device within the one or more media items. The playback position may be, for example, a timestamp corresponding to a position within a given media item, or an indication of a particular audio frame with the given media item. The indication of the playback position may take other forms as well.

In response to the first playback device initiating sharing of a playback session, the computing device may transmit an indication of the playback session to one or more other playback devices, which may be located in other respective media playback systems. For example, the computing device may transmit the indication of the playback session to a second playback device in a second media playback system. Additionally or alternatively, the computing device may transmit the indication to a respective control device, e.g., a smartphone, associated with the second media playback system.

In some implementations, a second listener of the second media playback system may have a user account associated with the provider of the second media playback system (e.g., a Sonos user account). Further, the second listener may configure their user account to subscribe to any playback sessions that are initiated for sharing via the first listener's user account. In this way the second listener may be a subscriber, or follower, of the first listener's playback sessions.

Accordingly, the second playback device and/or control device may receive the indication of the playback session from the computing device based on the second listener's status as a subscriber. The control device may then display an indication of the first listener's playback session in the form of a notification or other alert, for example. In some cases, where the second playback device receives the indication of the playback session from the computing device, the second playback device may cause the control device to display the indication by relaying the indication to the control device.

In some implementations, the displayed indication on the control device may be a selectable indication that, when selected, causes a request to be transmitted to the computing device to join the playback session. In response, the second playback device may receive from the computing device indications of the one or more media items and the playback position of the first playback device. The second playback device can then retrieve the media items from a media service, such as a cloud-based media service (e.g., Spotify), and begin playback from the playback position. In this way, the second playback device may play back the one or more media items in substantial synchrony with the first playback device.

The level of synchrony that the computing device may provide between playback devices in separate media playback systems, in separate households, is less rigorous than that required of multiple playback devices in the same media playback system (e.g., in the same room) that are grouped for synchronous playback. For instance, the synchronous playback of media content among playback devices within the same media playback system may be handled by one or more local playback devices acting as a group coordinator, according to known methods. On the other hand, due to the transmission of information between the various devices discussed herein, network attenuation and other factors may result in a difference in playback timing of several seconds between playback devices. However, such a difference may have no impact on the listening experiences of the participants.

In some situations, the indication of the one or more media items that the first playback device transmits to the computing device, and which are then transmitted to the second playback device, might include media content identifiers that are associated with a given music service (e.g., Apple Music). However, the second playback device might not have access to the given music service. For instance, the second listener might not have an Apple Music account. Thus, the second playback may transmit a request for matching media content to the computing device. In response, the computing device may determine matching media content identifiers (i.e., for the same songs) from a different music service to which the second playback device does have access (e.g., Amazon Music Unlimited). The computing device then transmits an indication of the one or more media items to the second playback device that includes the matching media content identifiers, which the second playback device can then use to retrieve the media items from the music service.

During playback by the second playback device, the second listener might be able to view, via a control device of the second media playback system, the one or more media items in the playback queue based on the indications received from the computing device. However, the playback queue might not be editable by the second listener. Further, transport controls might be disabled at the second playback device during the playback session.

On the other hand, as noted above, the first listener of the first playback device that initiates sharing of the playback session might make changes to the playback queue during the playback session, including updates to the content and perhaps the order of media items in the playback queue. Further, the first playback device may execute transport control commands issued by the first listener during playback. All of the above may be reflected in the playback session that is shared among other participating playback devices.

For example, the first listener may add, via a control device in the first media playback system, a new media item to the playback queue, to be played back after the currently playing media item ends. Accordingly, the first playback device may send an indication of the new media item to the computing device along with an indication of its position within the queue. The computing device may then transmit the indications of the new media item and its position within the queue to the second playback device.

Similarly, the first playback device may execute a skip track command that is issued by the first listener via a control device of the first media playback system, or via a control interface of the first playback device. In addition to updating its own playback position by skipping the currently playing song, the first playback device may transmit to the computing device an indication of an updated playback position, which may indicate the beginning of the next media item in the playback queue. The computing device may transmit the indication of the updated playback position to the second playback device. The second playback device then updates its own playback position accordingly, and thereby remains in substantial synchrony with the first playback device.

As another example, volume adjustments made to the first playback device by the first listener might be relayed to the second playback device on a relative basis. For example, if the first listener increases the volume of the first playback device by 10% at a given playback position, the first playback device may transmit an indication of the volume adjustment and the playback position to the computing device. The computing device then transmits the indication of the volume adjustment and playback position to the second playback device, which may increase its volume by 10%. This may allow for relative volume changes to be shared, even if the first listener and second listener are experiencing the playback session at different volumes.

In some implementations, the playback session may be enabled for shared control of the playback queue. For example, the first listener may authorize, via a setting in a control device, control commands that originate from devices associated with the second listener's user account. As discussed above, the playback queue of the first playback device may be maintained locally, on the first playback device or another device within the first media playback system. When the first playback device transmits the indication of the one or more media items to the computing device, the first playback device may transmit an indication of all media items in the playback queue, such that the second playback device receives the indication of all media items in the playback queue from the computing device. Accordingly, the second playback device may maintain a copy of the playback queue that mirrors the copy maintained by the first playback device.

When either the first or second playback device receives an update to the playback queue from its respective listener, an indication of the update may be transmitted to the computing device. The computing device then sends a corresponding indication to the other playback device, such that the respective copy of the playback queue is updated in both locations. Similarly, transport control commands may be executed during the playback session by either playback device, and then an indication of the updated playback position may be routed to the other playback device as discussed generally above.

As another variation, it is possible that the playback queue might take the form of a cloud-based queue that is maintained at the computing device, and where local copies of the queue are not created at either the first playback device or the second playback device. For example, the first user may create, modify, and otherwise exercise control over such a cloud-based queue, as well as initiate sharing of a playback session, via a control device of the first media playback system, for instance. As playback proceeds, the computing device may send indications of one or more media items to the first playback device, similar to other examples discussed herein, which the first playback device may use to retrieve the media item(s) from a music service.

In some embodiments, the playback session may be used as a forum for one or both of the first and second listeners to communicate with the other. For example, the first playback device may include a networked microphone device (NMD). During the playback session while media content is playing back, or perhaps during a period in which playback has been paused by the first listener, the NMD of the first playback device may detect speech in the vicinity of the first playback device. The first playback device may record the speech and transmit it to the computing device, which may then transmit the recorded speech to the second playback device for playback. In a similar way, the second playback device may record speech via its own integrated NMD, and the computing device may facilitate two-way communication between the participating playback devices of a given playback session. This may further enhance a shared-listening experience between the first and second listeners.

In an example where the speech is recorded while media content is being played back, the first playback device might also transmit an indication of the playback position in the media content where the speech occurred. This may be useful, for instance, where the speech is associated with or refers to the media content. For example, the first listener might be a musician who initiates a playback session to play back one of their songs for their followers, overlaid with live commentary that may refer to certain portions of the song. By transmitting the playback position of the recorded speech, the second playback device may play back the recorded speech at the corresponding playback position. In other implementations, the first playback device may record and transmit the speech without an indication of the corresponding playback position within the media content where the speech occurred.

Additionally or alternatively, a NMD on a control device of the first playback system may capture the speech, rather than an NMD of the first playback device. In either case, the control device may include a push-to-talk style interface that allows the first listener to toggle between transmitting audio recorded by the NMD, to transmitting no recorded audio content. Conversely, the second listener might have the option, via a setting in a control device, to turn off overlaid speech content from the first playback device.

In some implementations, the computing device may record a given playback session initiated by the first playback device, including any transport controls, speech overlays, or other changes made by the first listener during the playback session. For example, the computing device may store the recorded playback session with other recorded playback sessions associated with the first listener's user account. This may allow a subscriber who was not able to tune in to the "live" playback session to retrieve the recorded version of the playback session and experience it at a later time.

The recording of the playback session might not take the form of a continuous audio recording. Rather, the computing device might store metadata identifying the media items that were played back during the playback session, along with any playback positions where recorded speech was overlaid or transport controls occurred.

In some implementations, the first playback device may be a portable playback device, such as a pair of headphones or a car speaker, among other possibilities. This may allow for the sharing of a "portable" playback session that is associated with an activity such as walking through a park or driving through a scenic landscape, among numerous other possibilities. Further, the playback session might be associated with a particular location where the playback session occurs. For instance, the first listener may share a playback session while walking through Central Park in New York. While other listeners of other portable playback devices might join the shared playback session, as discussed above, the computing device may store a recording of the playback session that includes a geotag indicating the location where the playback session occurred.

Thereafter, a second listener who subscribes to the playback sessions of the first listener may receive an indication that the location-based portable playback session is available for playback. For example, the computing device may transmit a notification to the second listener's control device (e.g., smartphone) advertising "Would you like to play [First Listener's] Central Park soundtrack?" In some cases, the computing device may transmit the notification based on the geotag associated with the recording and an indication that the second listener is near Central Park. For instance, an approximation of the second listener's location may be available based on one or more services running on the second playback device or the second listener's smartphone (e.g., GPS, WiFi, or cellular network-based location services).

A portable playback session may also include recorded speech overlays, as discussed above. In this way, the first listener may create a portable playback session that may serve as a walking or driving tour of a given location, including audio content selected by the first listener along with their overlaid commentary. Other possibilities also exist.

In further examples, the computing device may overlay other ambient sounds on the audio content of a playback session that are location-based. For instance, if the first listener is located in Seattle, where it is currently raining, the computing device might add rain sounds in the background of the playback session, including in between the playback of media items. Accordingly, the playback session may be experienced by a listener in Los Angeles, for example, where it is not currently raining. Other examples are also possible, such as waves and seagulls for a playback session near the beach, or faint traffic sounds for a playback session in a crowded urban area. In this way, the overlaid ambient sounds may further recreate the mood and experience of the first listener during the playback session.

According to the examples discussed herein, the computing device may also track playback information related to digital rights management and associated licensing fees. For instance, unlike traditional terrestrial radio where it may be difficult to determine how many listeners were tuned in during playback of a given song, the implementations discussed herein can provide much more granular listener information. Playback information from one or more media playback systems may indicate, for example, how many playback devices played back a given song, where the playback devices were likely located based on an assigned device name (e.g., Kitchen), and/or an estimation of user presence based on issued commands and other interactions, among other information. In some cases, this additional information may be used to develop more specific arrangements and fee schedules for the licensing of digital content playback.

Additionally, the sharing of a playback session as discussed herein may be used to track impressions that are created by the playback of a given media item, and perhaps give attribution when the impression leads to other related activities. As an example, a musical "influencer" might have a large number of followers who tune in to the influencer's weekly playback session, during which the influencer plays new and upcoming popular music that has not yet achieved widespread notice. An artist, a record label, or another promotional agency might partner with the influencer to promote their respective content, such that the influencer is compensated based on the impressions that their playback session creates.

For instance, the influencer may add a new media item from a given partner to their playback queue during the playback session. When the media item is played, the computing device may have a record of each other listener that is participating in the playback session, and thereby playing back the new media item. If one of the other listeners then undertakes a related activity at a later time, such as adding the media item to a list of favorites, exploring and playing back other media items by the same artists, among other possibilities, the computing device may determine that there is a reasonable likelihood that the impression created by the influencer led to the additional activity. Accordingly, the influencer might be compensated by the partner according to an agreed upon fee schedule for not only the quantifiable number of listeners they reached, but also for additional activities that the influencer may have helped to generate. Other, similar implementations are also possible.

As noted above, embodiments described herein relate to creating and facilitating a shared playback session between playback devices in separate media playback systems. In some embodiments, for example, a computing system is provided including at least one processor, a non-transitory computer-readable medium, and program instructions stored on the non-transitory computer-readable medium that when executed by the at least one processor, cause the first playback device to perform functions including (i) while operating in a first media playback system, receiving, from a computing device over a wide area network (WAN), an indication that a second playback device operating in a second media playback system has initiated sharing of a playback session; (ii) transmitting, to the computing device over the WAN, a request to join the playback session; (iii) receiving, from the computing device over the WAN, playback session information including indications of (a) one or more media items in a queue designated for playback by the second playback device and (b) a playback position of the second playback device within the one or more media items; (iv) retrieving, from a media service, the one or more media items in the queue designated for playback by the second playback device; and (v) playing back the one or more media items beginning at the playback position.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-7B.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
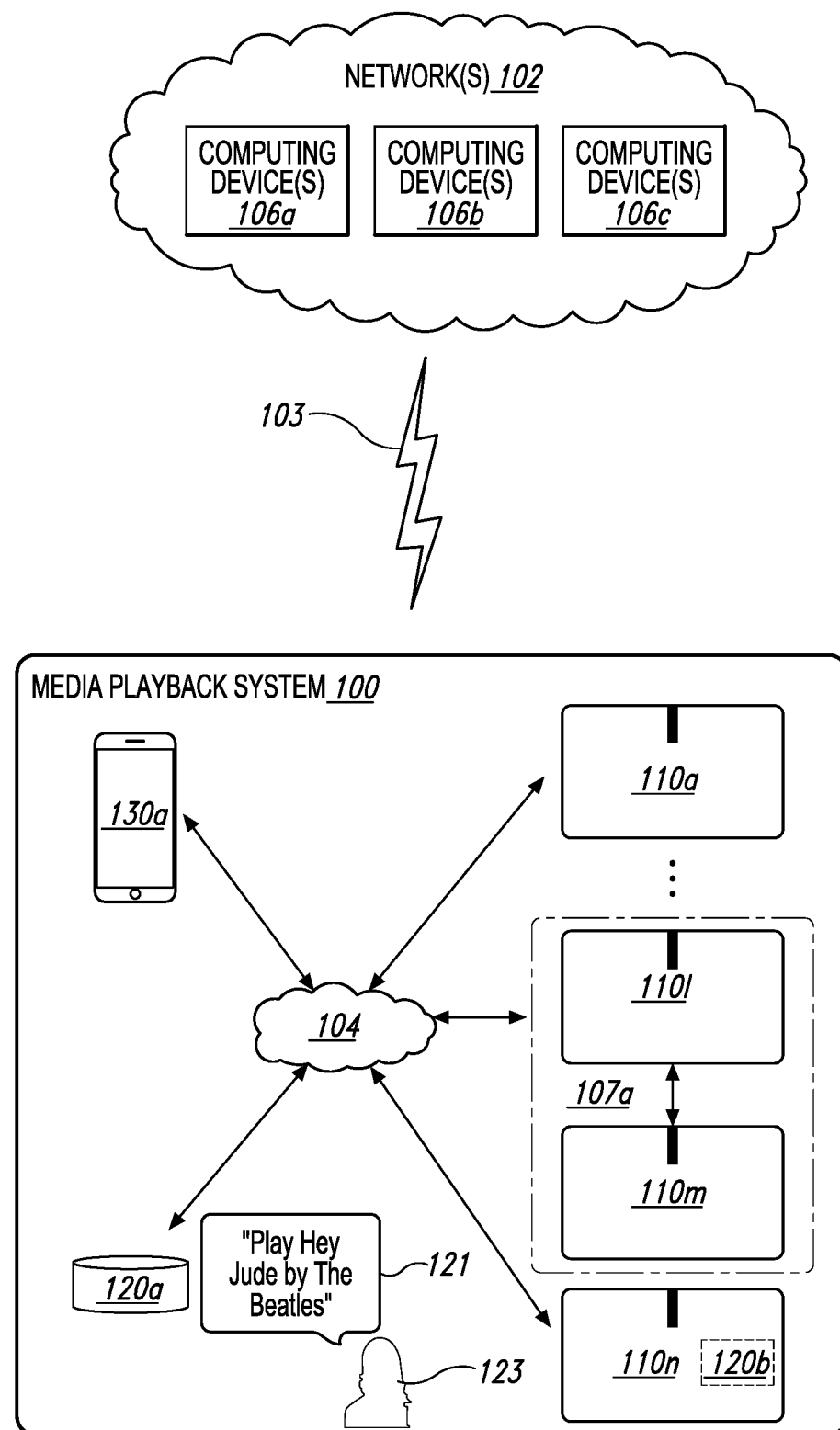
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices.

Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
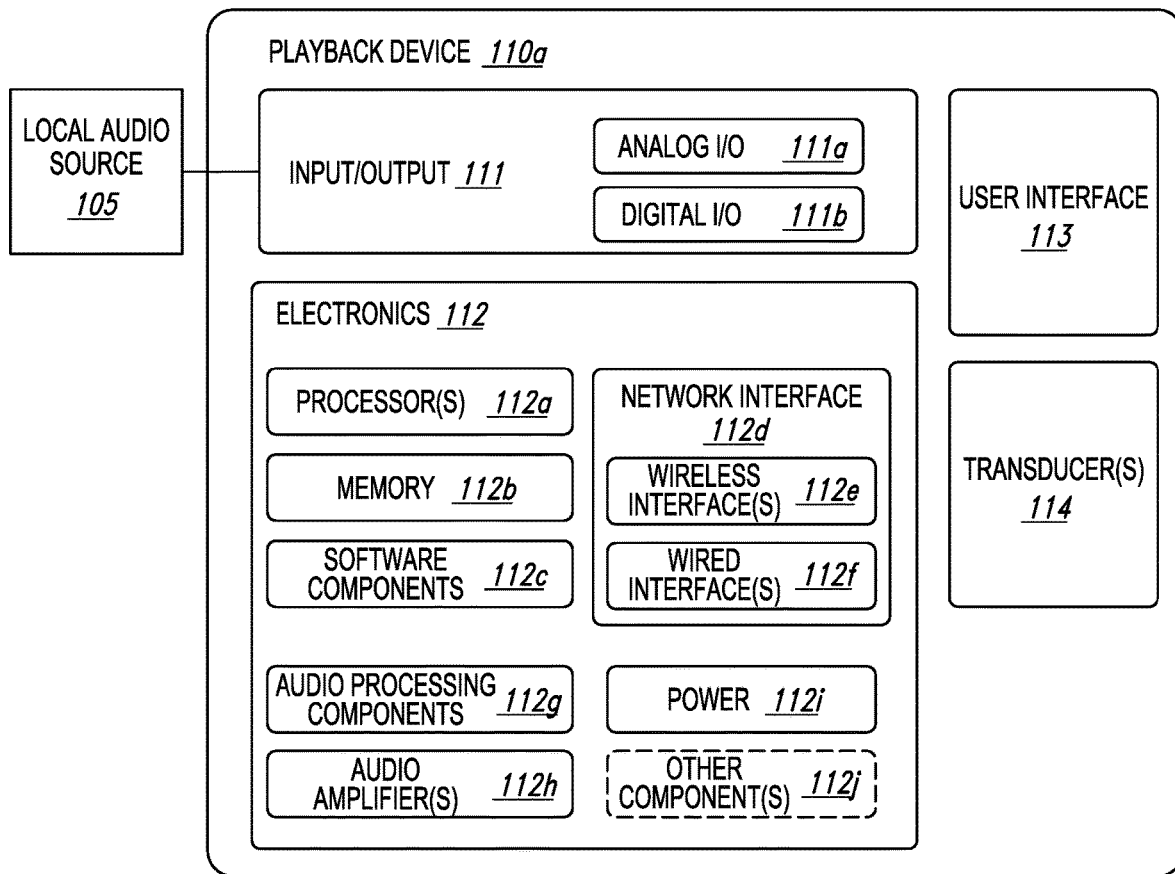
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
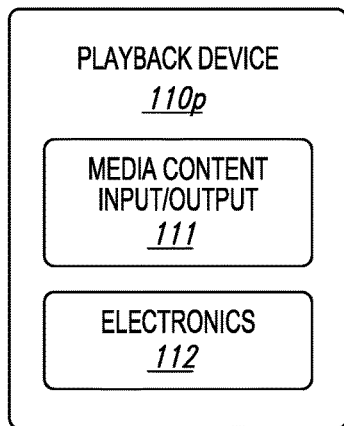
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
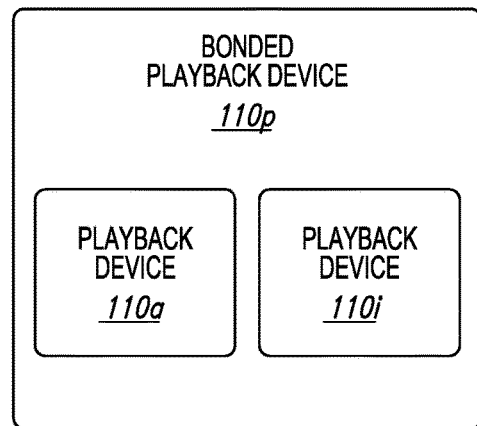
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
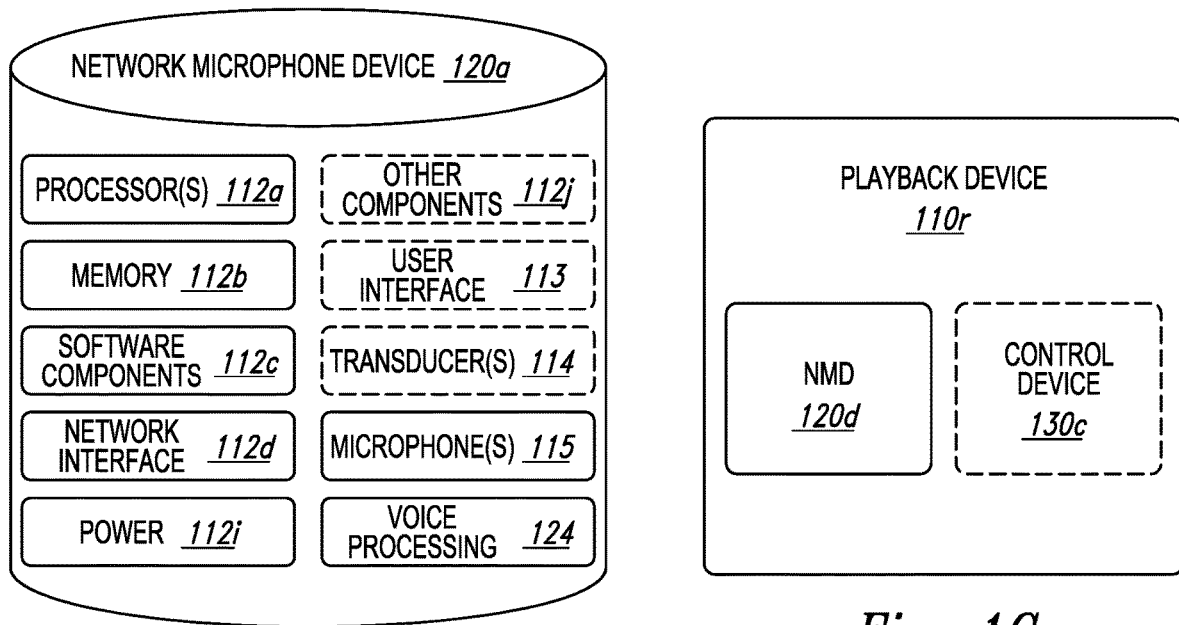
FIG. 1H is a partially schematic diagram of a control device.
Figure 1H:
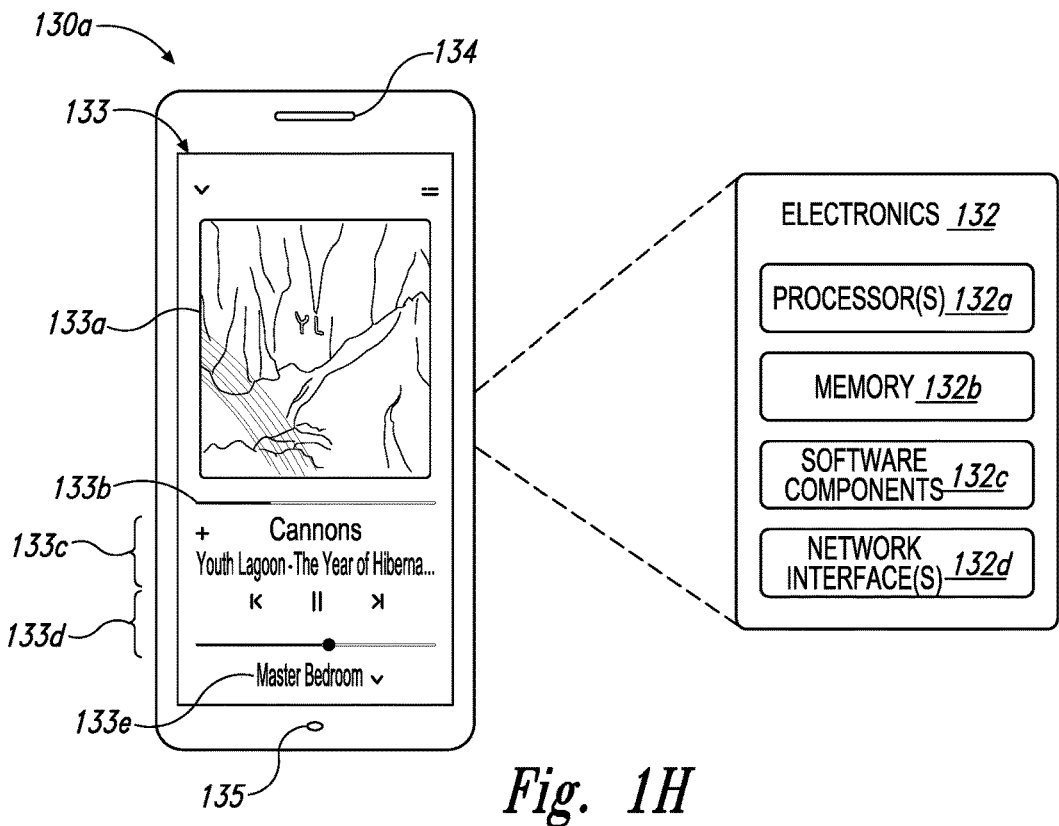

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
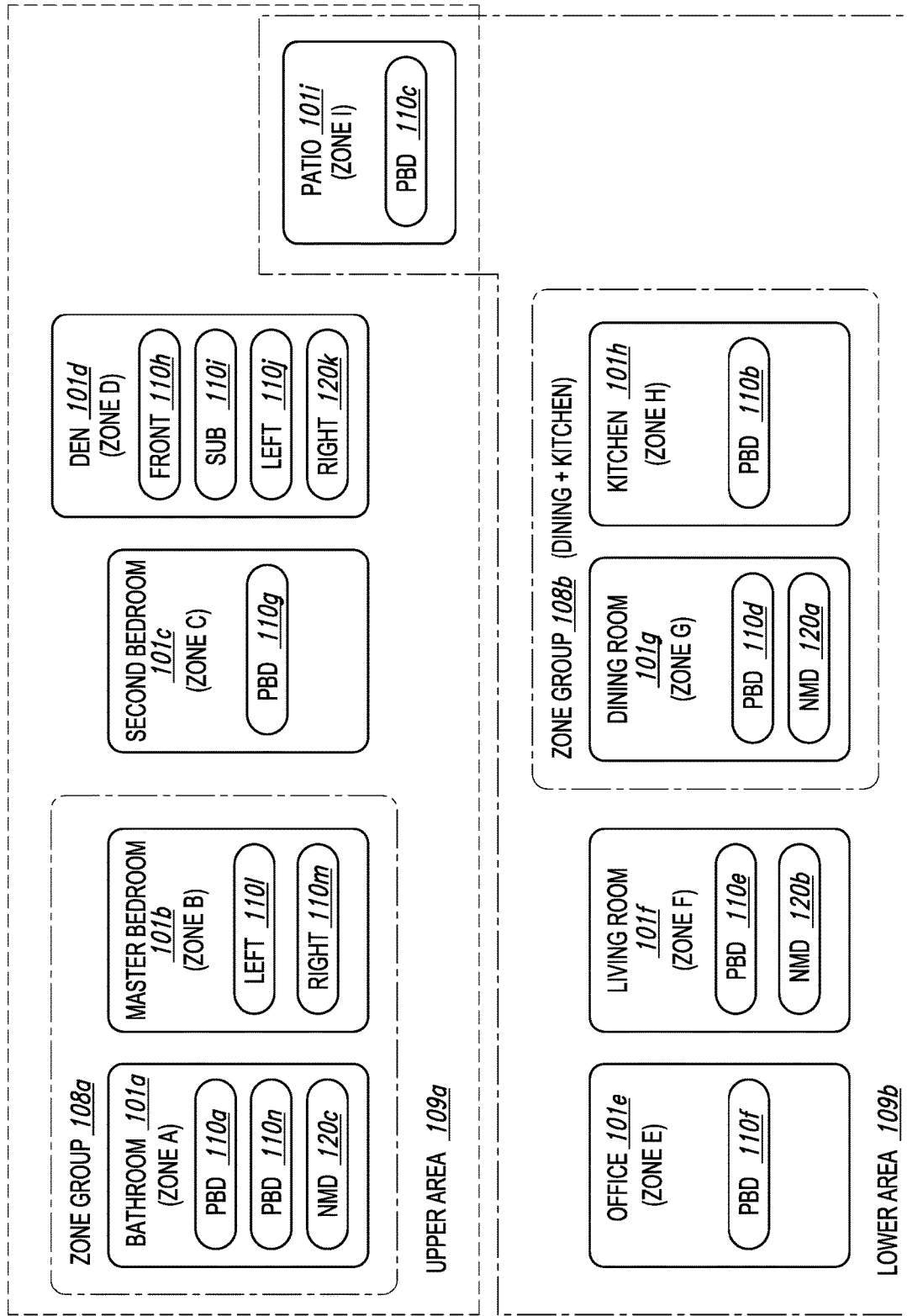
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
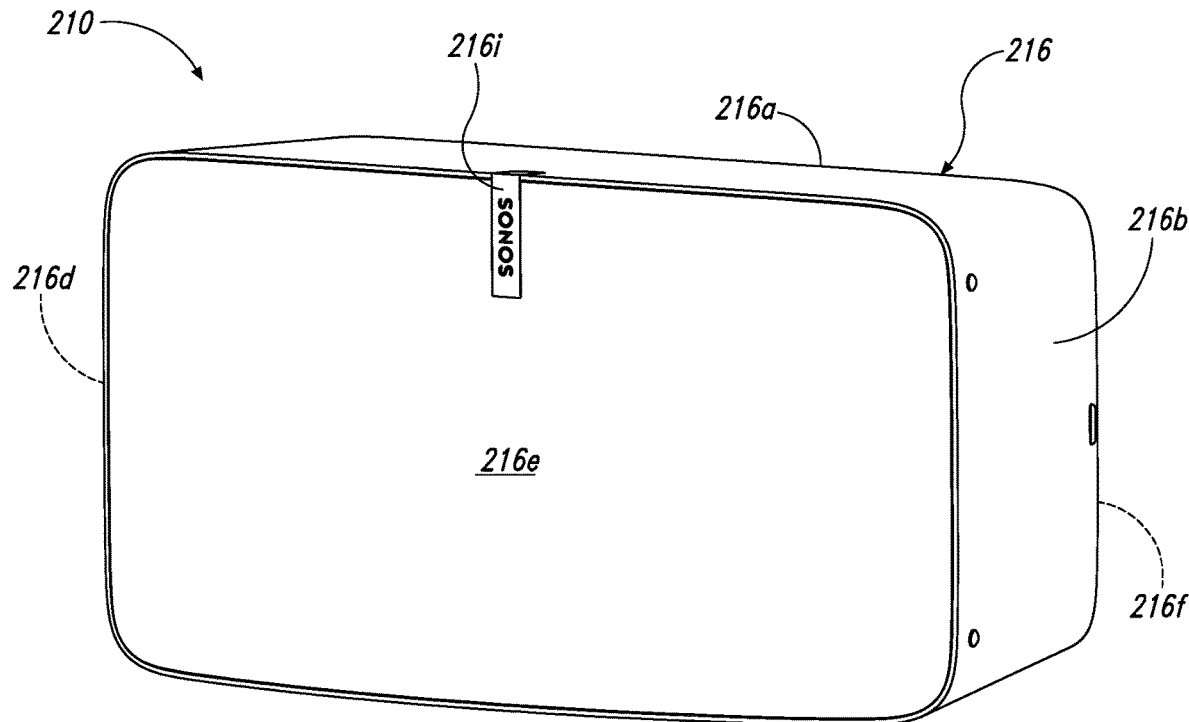
FIG. 2A is a front isometric view of a playback device configured in accordance with aspects of the disclosed technology.
Figure 2B:
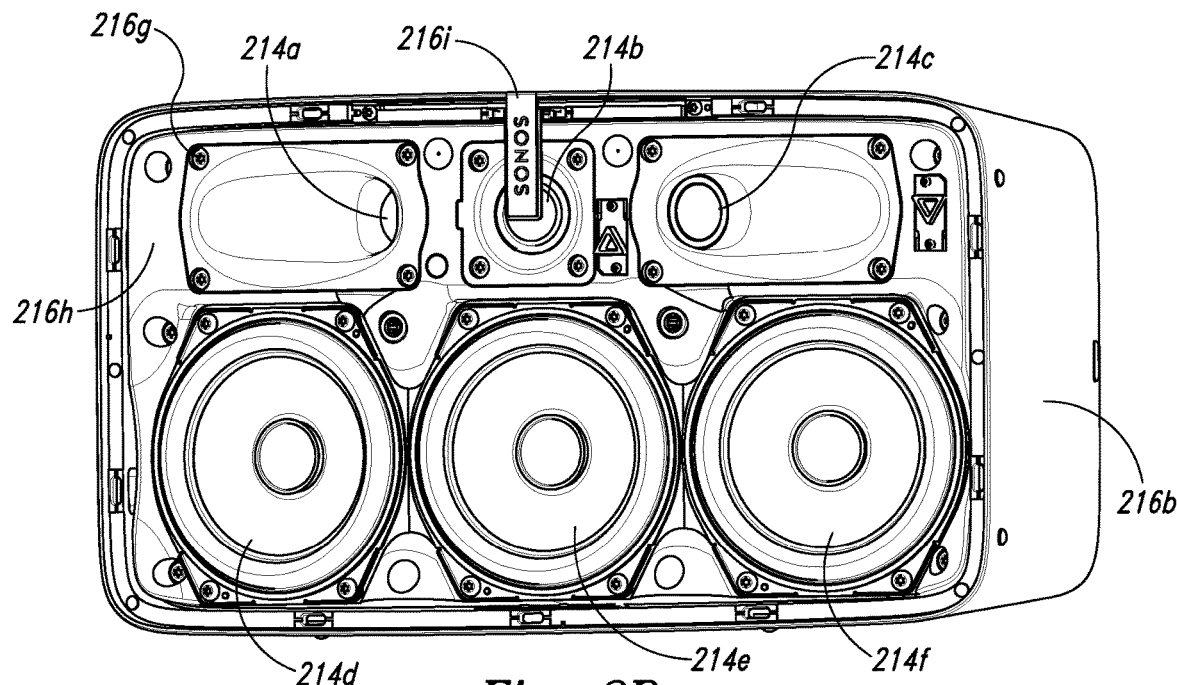
FIG. 2B is a front isometric view of the playback device of FIG. 3A without a grille.
Figure 2C:
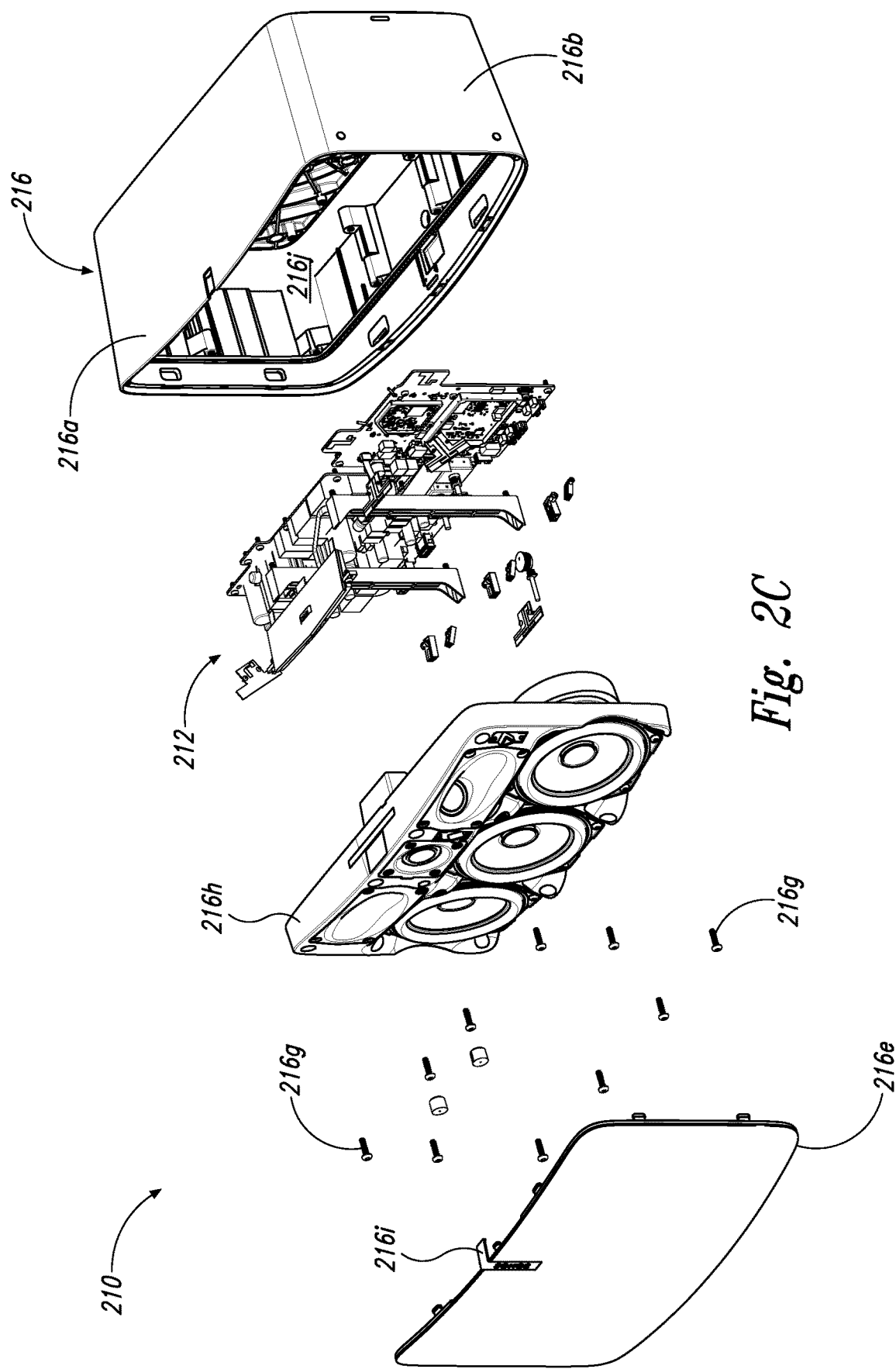
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
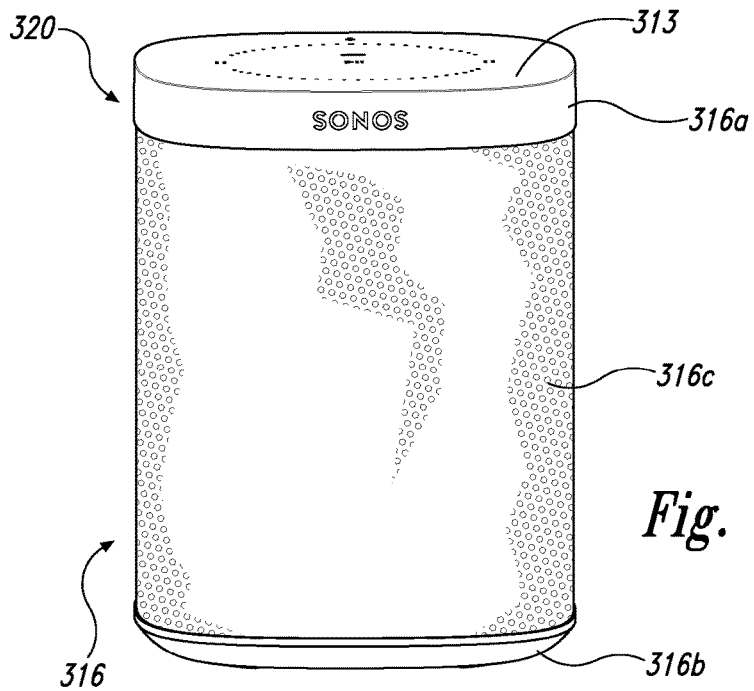
FIG. 3A is a front view of a network microphone device configured in accordance with aspects of the disclosed technology.
Figure 3B:
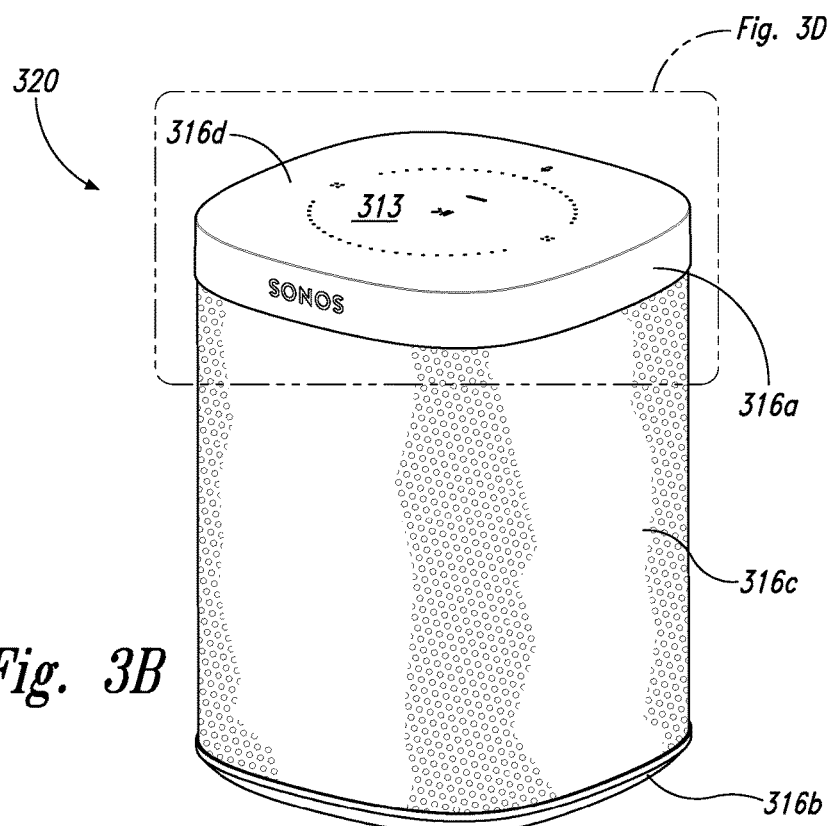
FIG. 3B is a side isometric view of the network microphone device of FIG. 3A.
Figure 3C:
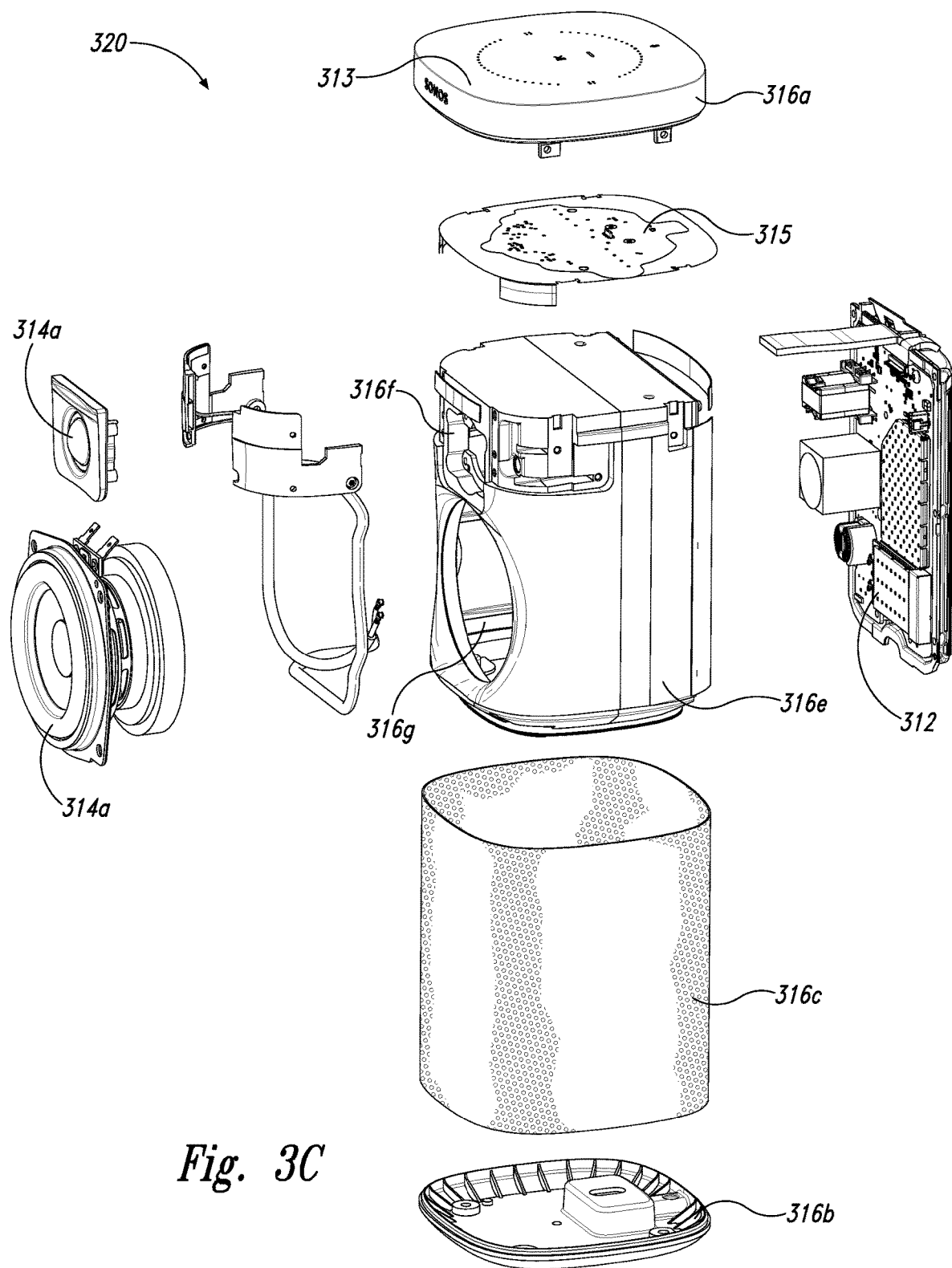
FIG. 3C is an exploded view of the network microphone device of FIGS. 3A and 3B.
Figure 3D:
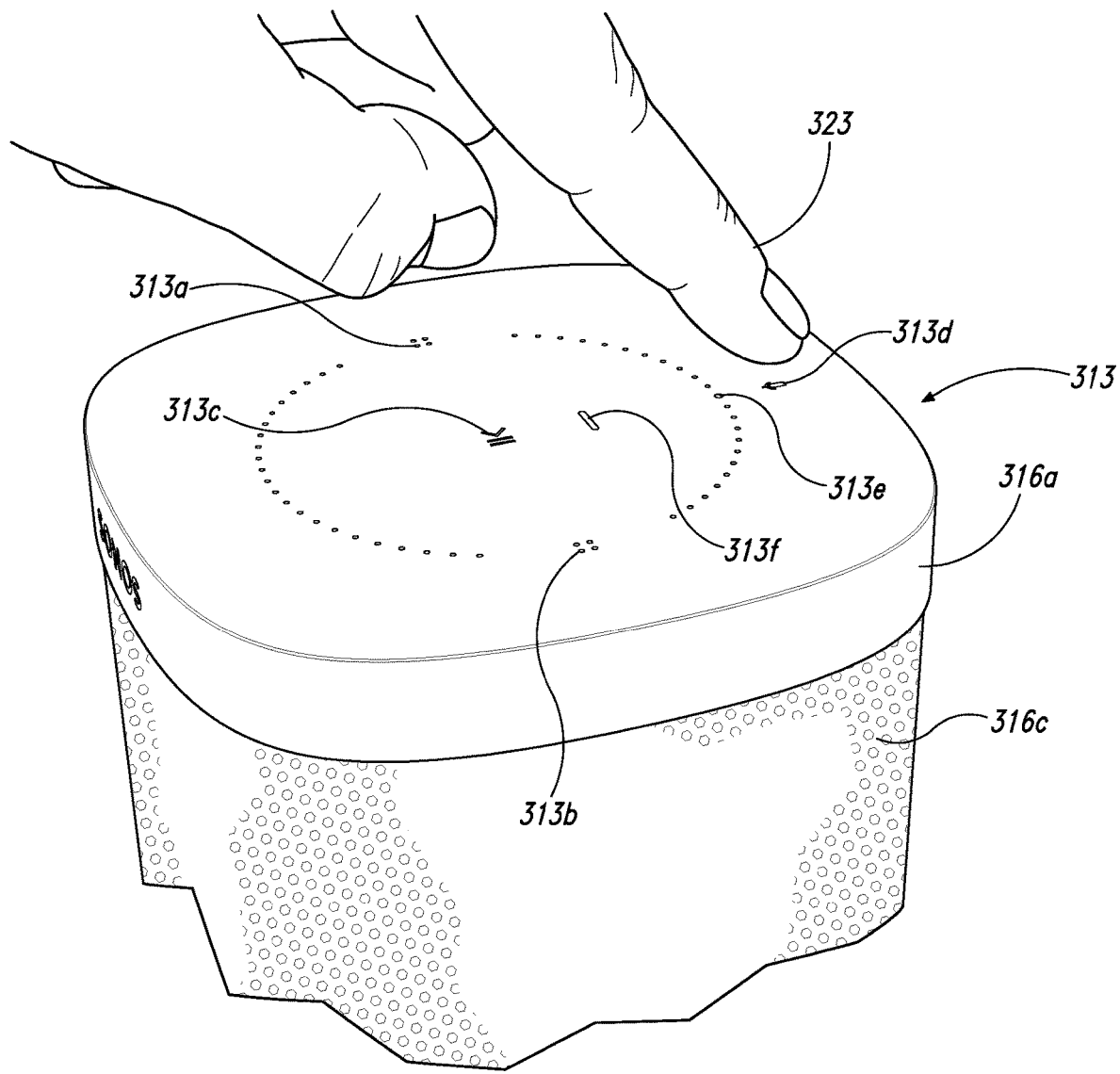
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
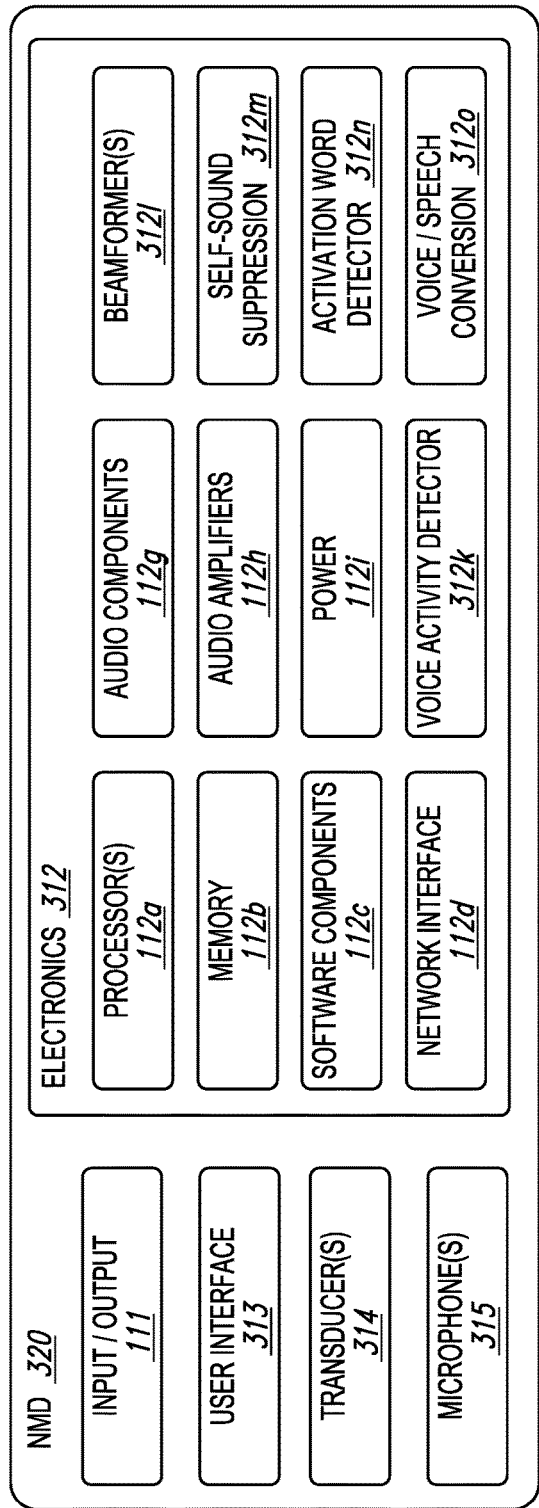
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
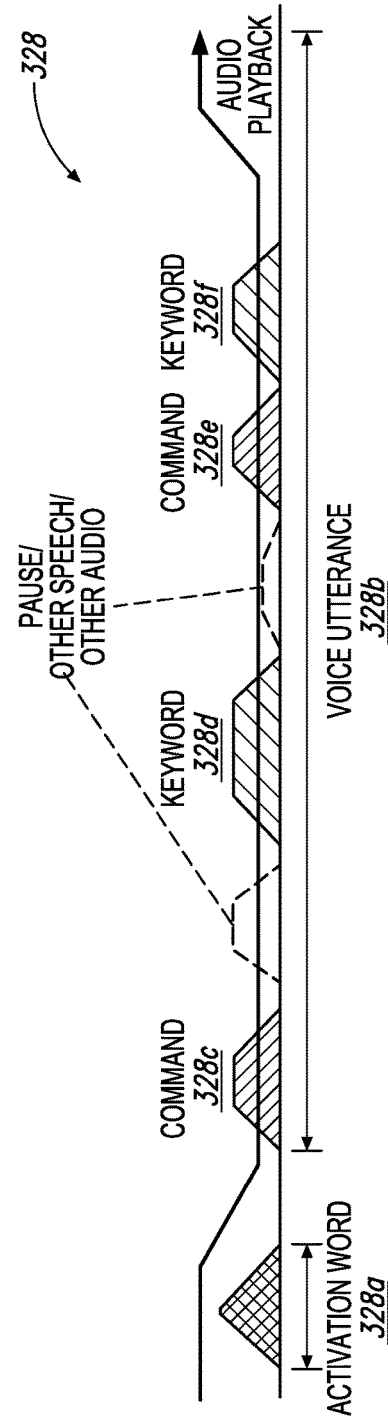
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
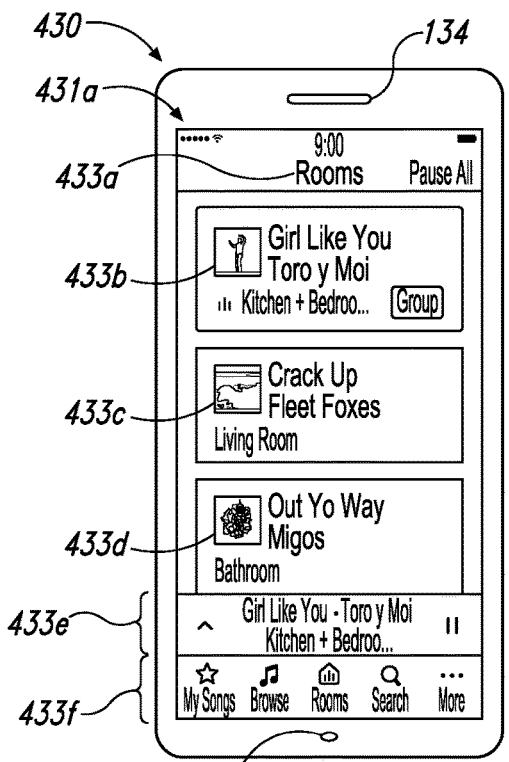
FIGS. 4A-4D are schematic diagrams of a control device in various stages of operation in accordance with aspects of the disclosed technology.
Figure 4B:
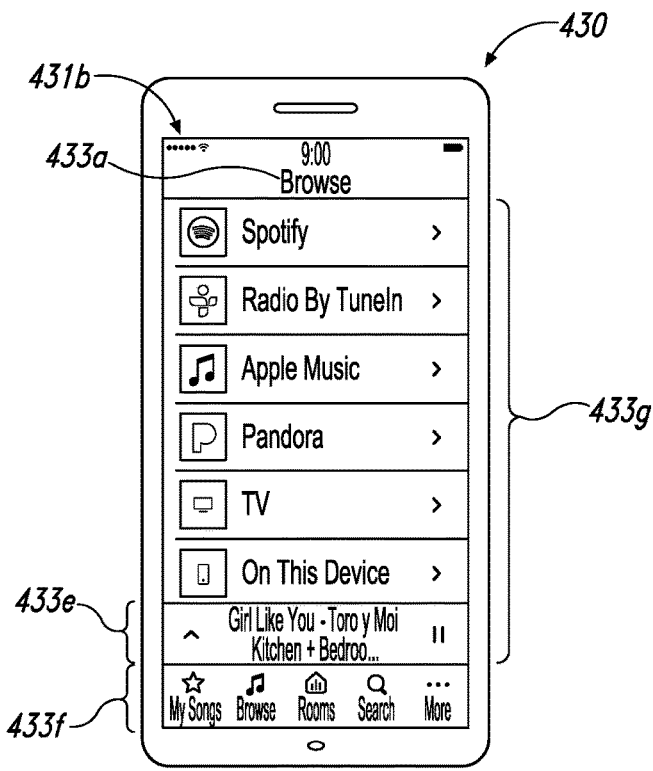
Figure 4C:
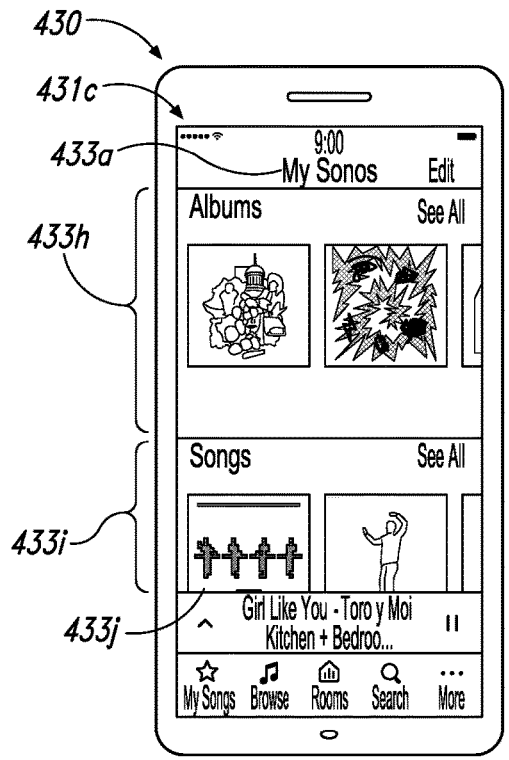
Figure 4D:
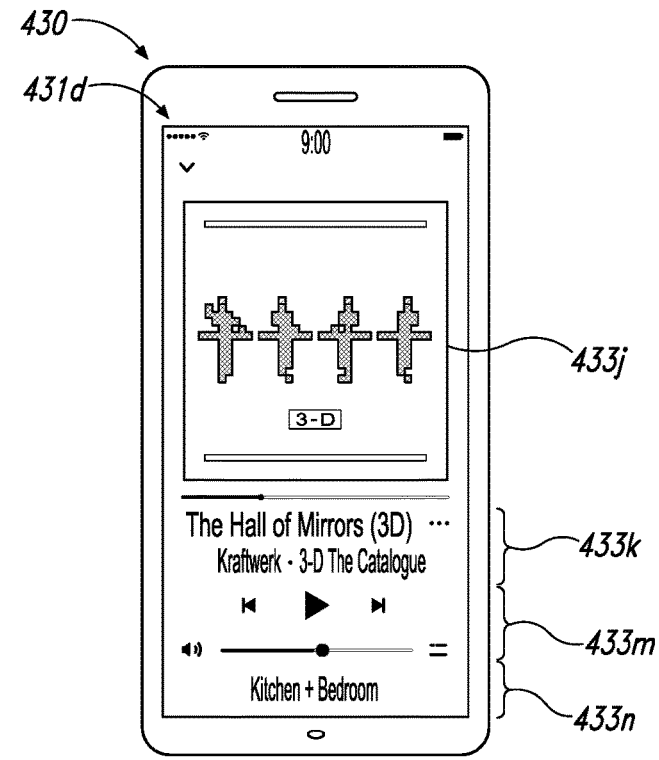

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
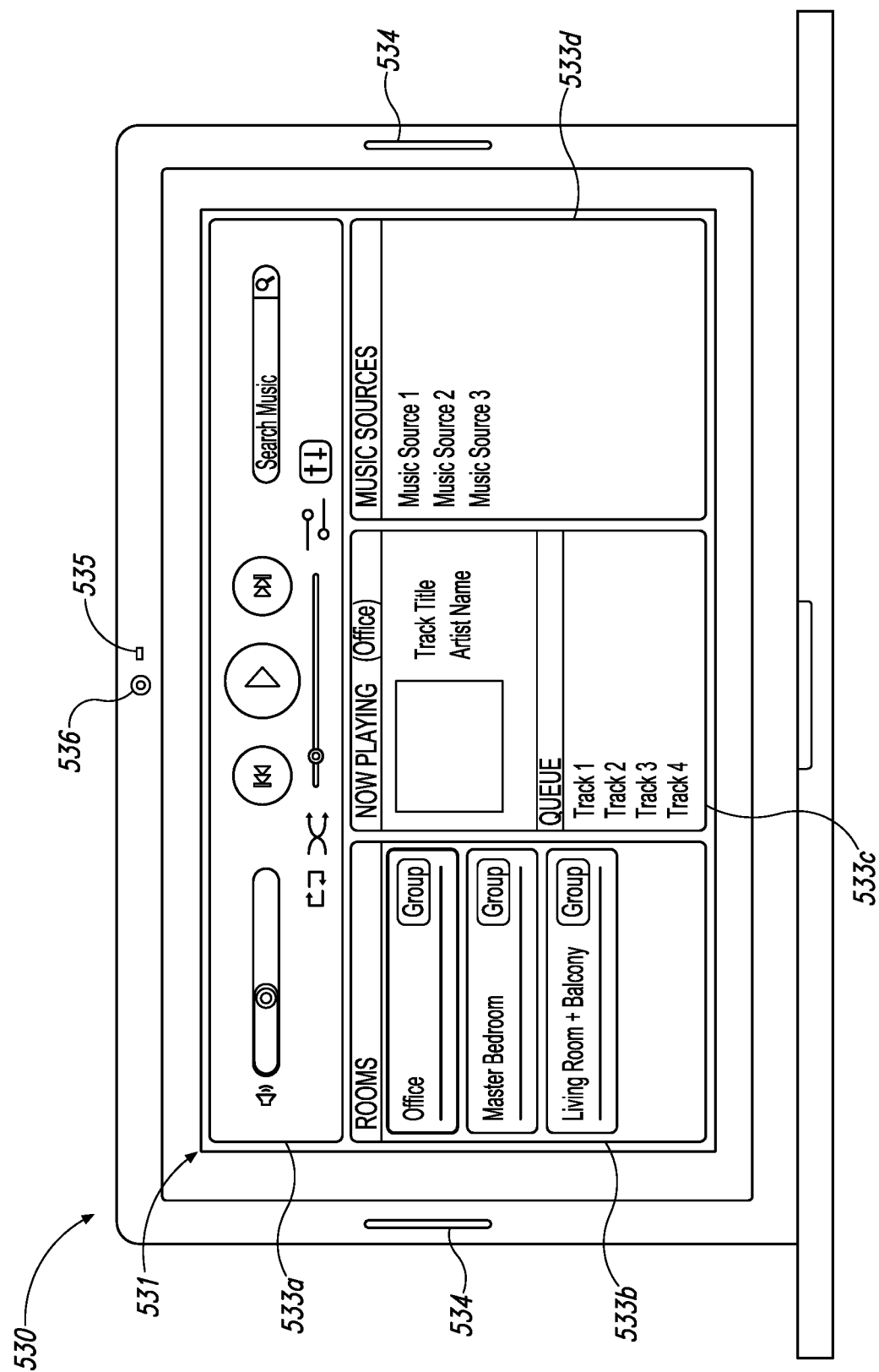
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

IV. Example Implementation for Playback Queues for Shared Experiences

Figure 6:
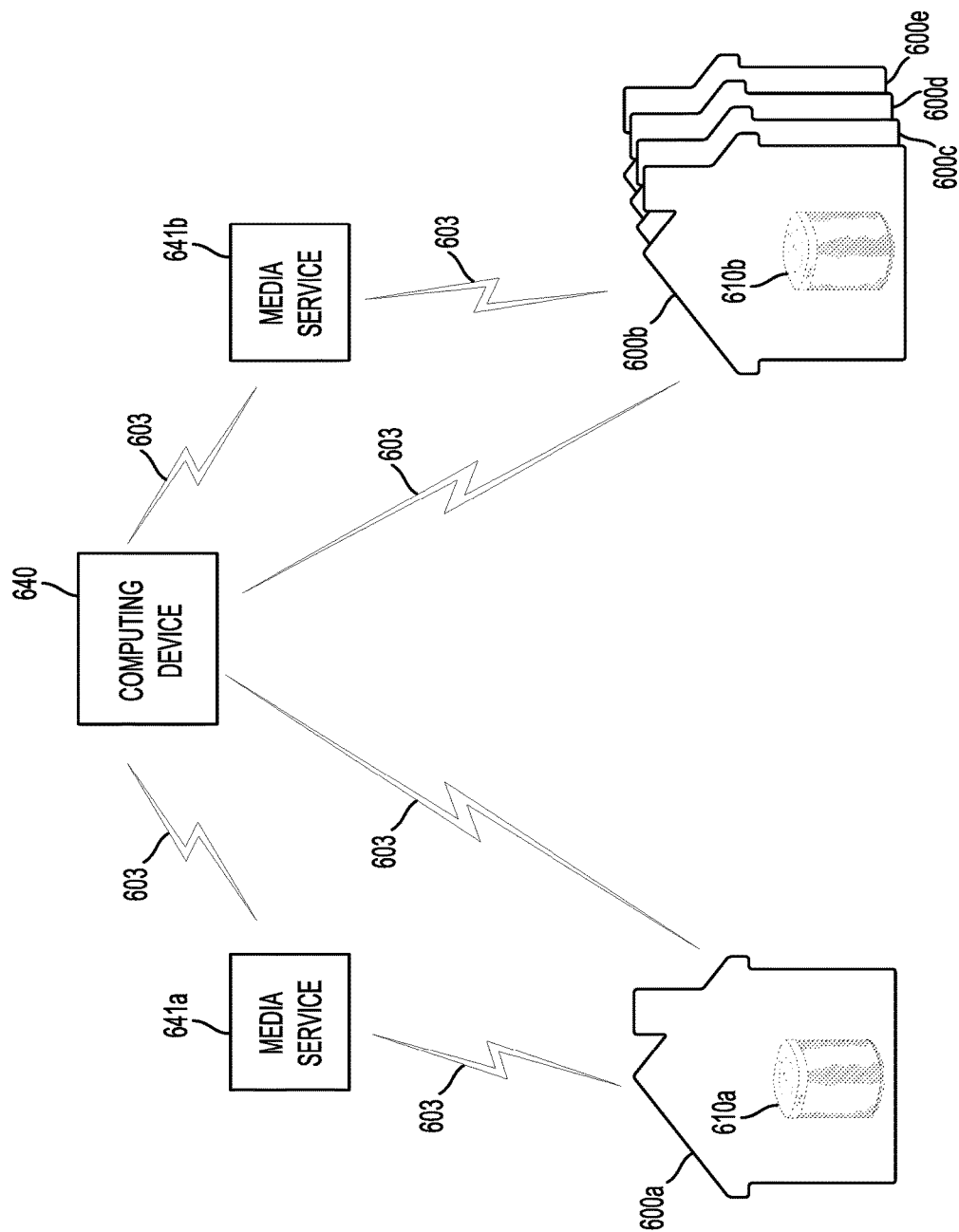
FIG. 6 is a schematic diagram of a system for providing playback queues for shared experiences.

FIG. 6 is a schematic diagram showing a computing device 640 that facilitates sharing of a playback session between two or more playback devices that are located in different media playback systems (e.g., different households). For example, the computing device 640 may facilitate sharing of a playback session between a first playback device 610a, located in a first media playback system 600a, with a second playback device 610b located in a second media playback system 600b. For example, the computing device 640 may be represented by one or more of the computing device(s) 106 of the cloud network(s) 102 shown in FIG. 2 and discussed above. Further, the first media playback systems 600a and 600b may be similar to the media playback system 100 shown in FIG. 1. Other participating media playback systems 600c, 600d, and 600e are also possible.

Further, the first playback device 610a may retrieve the media items for playback during the playback session from a first media service 641a. For example, the first media service 641a may be a cloud-based media service, such as Spotify, and may generally correspond to one or more of the computing devices 106 shown in FIG. 2 and discussed above. In some examples, the second playback device 610b might also retrieve the media items from the first media service 641a. In other examples, and as shown in FIG. 6, the second playback device 610b may retrieve the media items from a second media service 641b. The devices shown in FIG. 6 may communicate via one or more links 603, which may be similar to the link 103 discussed above with respect to FIG. 2. Various example implementations and embodiments will now be discussed with reference to FIGS. 7A-7B.

Figure 7A:
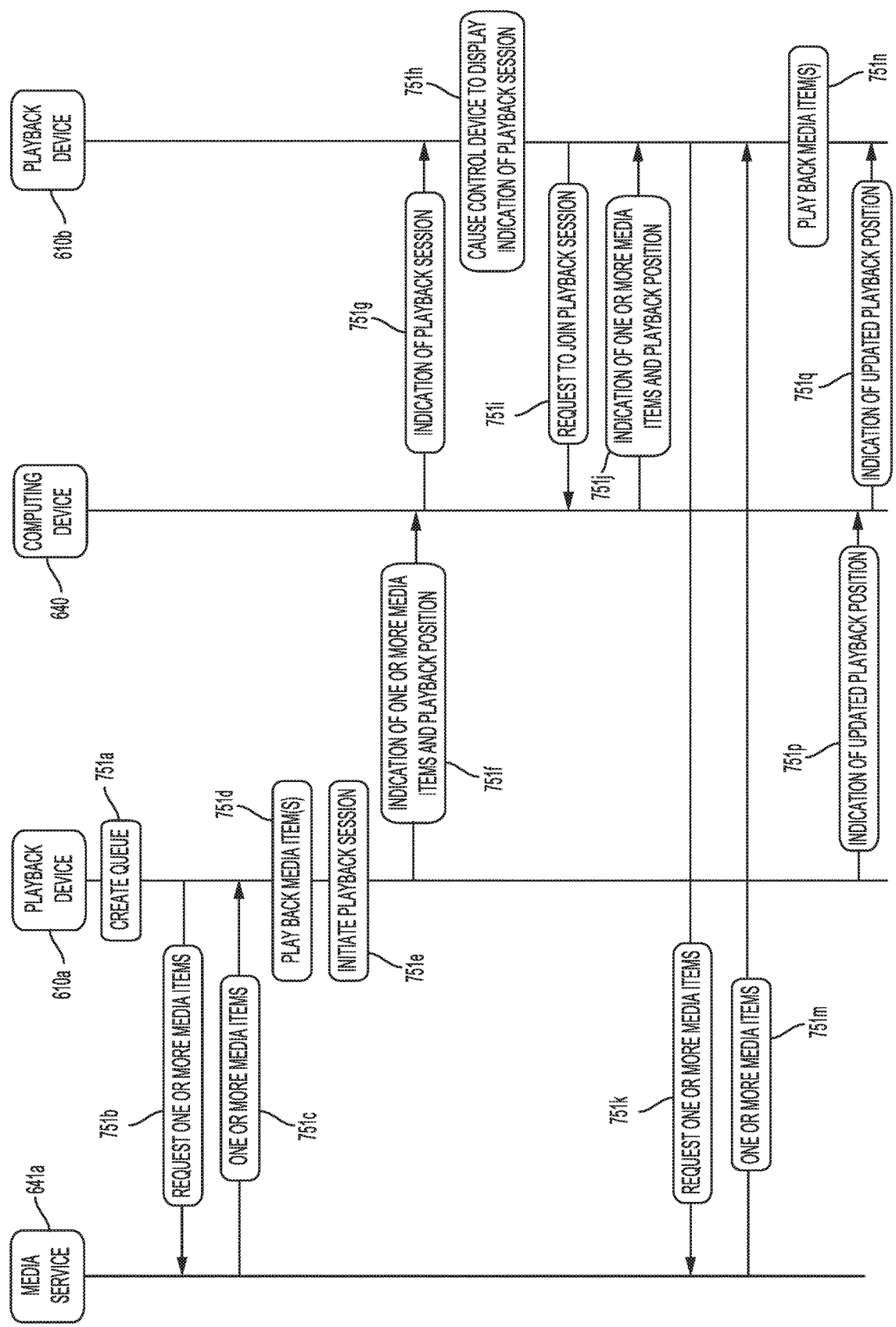
FIG. 7A is a message flow diagram involving a computing device, two playback devices, and two media services.

FIG. 7A is a message flow diagram illustrating data exchanges between the various devices shown in FIG. 6, including the computing device 640, which may facilitate sharing of a playback session that is initiated in a first media playback system 600a.

At step 751a, the first playback device 610a may facilitate the creation of a playback queue by a first listener in the first media playback system 600a. For example, the first listener may browse media content via a control device, such as the control device 130a shown in FIG. 1H and discussed above. The first listener may add media items to the playback queue, which may be stored on the first playback device 610a. In some embodiments, the playback queue may additionally be stored on the control device. In some other examples, the playback queue may be a cloud-based queue that is stored on the computing device 640. Other examples are also possible, including combinations of the above.

Moreover, in the examples herein, any transmission of data to or from a given playback device, or the receipt and/or execution of listener commands by a given playback device, may alternatively be sent, received, or executed by an associated control device of the media playback system in cooperation with the given playback device, unless otherwise noted.

Upon a command form the first listener to begin playback of media items from the playback queue, the first playback device 610a may retrieve the media items for playback. For example, at step 751b, the first playback device 610a may request one or more media items from the media service 641a. For example, the first media service 641a may be a media service to which the first listener has a subscription account, enabling devices of the first media playback system 600a to access media content via the first media service 641a. Accordingly, at step 751c, the first playback device 610a may receive the one or media items.

At step 751d, the first playback device 610a may play back the one or more media items received from the first media service 641a. In some embodiments, the first media playback system 600a may also include other playback devices, similar to the example of FIG. 1, some of which might be configured to play back the media content of the playback session in synchrony with the first playback device 610a.

At step 751e, the first playback device 610a initiates sharing of a playback session. For example, while the first playback device 610a is playing back the one or more media items, the first listener may issue a command to initiate sharing. The command may involve the first listener selecting a "Share" button in an interface on a control device of the first media playback system 600a. In some implementations, the first listener may initiate the playback session by issuing a voice command to "Share this playback session," that may be received by a NMD within the first media playback system 600a. Other examples are also possible.

In some implementations, the first playback device 610a might alternatively initiate sharing of a playback session based on other cues, such as a scheduled time on a given day. For instance, the first listener may configure the first playback device 610a to automatically begin play back from a particular queue, and to initiate sharing of a new playback session, each morning at a given time. In this way, friends or other subscribers may tune in to the first listener's "Morning Playlist" each day. Other examples are also possible.

At step 751f, the first playback device 610a may transmit, to the computing device 640, an indication of one or more media items and an indication of a playback position of the first playback device 610a within the one or more media items. In some implementations, the first playback device 610a may transmit all media items in the playback queue at once, so that the computing device 640 receives a copy of the playback queue in its entirety. If the first listener later updates the playback queue, by adding, removing or reordering media items in the queue, the first playback device 610a may send an indication of the update to the queue. In an example where the playback queue is a cloud-based queue that is stored at the computing device 640, it might not be necessary for the first playback device 610a to transmit an indication of the update to the computing device 640.

Alternatively, the first playback device 610a may send fewer than all media items in the playback queue to the computing device 640. For example, the first playback device 610a might send only the first one or two media items in the playback queue to the computing device 640. This may reduce the amount of data that must be transmitted in the first instance, as well as reduce the need for the first playback device 610*a* to send additional queue updates when some queue modifications are made (e.g., every time another media item is added to the end of the playback queue).

In this scenario, after sending the initial indication of the one or more media items to the computing device 640, the first playback device 610*a* may transmit additional indications of the next one or more media items in the playback queue as playback progresses at the first playback device 610*a*. For example, the first playback device 610*a* may initially send indication of the first two media items in the playback queue. As playback of the first media items nears its end (e.g., when 10 second of playback remains), the first playback device 610*a* may send an indication of the third media item in the playback queue. Other implementations are also possible.

In some embodiments, the extent to which the upcoming media items in the playback queue are transmitted to the computing device, or are otherwise visible to the second listener, may be dictated by the first listener. For example, the first listener may prefer to keep the names of some or all of the upcoming songs in the playback session unknown. This might be accomplished by the first playback device transmitting indications of fewer than all of the media items in the playback at a single time, and/or by the first user selecting a setting in a control device that dictates what is visible to the second listener. Other possibilities also exist.

As noted above, the first playback device 610*a* may also transmit to the computing device 640 an indication of the playback position of the first playback device 610*a* within the one or more media items. For example, if sharing is initiated when the first playback device 610*a* is in the midst of playing back a given media item, the indication of the playback position will allow other playback devices to join the playback session in substantial synchrony with the first playback device 610*a*. The indication of the playback position may take the form of a timestamp, or a particular audio frame within the currently playing media item, among other possibilities.

At step 751*g*, the computing device 640 may responsively transmit an indication of the playback session to the second playback device 610*b*, located in the second media playback system 600*b*. As noted above, the computing device 640 may transmit the indication of the playback session to the second playback device 610*b* based on the second listener following or otherwise subscribing, via the second listener's media playback system user account (e.g., a Sonos user account), to playback sessions initiated from the first listener's user account. In some other embodiments, the first listener might designate particular listeners, from a friends list, for instance, to receive an invitation to join the playback session. In some cases, the invitation may include a passcode to access the playback session. In other cases, any listener with the invitation (or link embedded in the invitation) may access the playback session.

Additionally or alternatively, the computing device 640 might facilitate a searchable list that includes indications of ongoing playback sessions that any listener might browse through and join. For instance, the first listener might designate their playback session as a "Public" playback session, and provide classification tags (e.g., type of music) and/or a description of the media content and, if applicable, commentary that will be included. Accordingly, the computing device 640 may include the playback session in the searchable list of public playback sessions.

At step 751*h*, after receiving the indication of the playback session, the second playback device 610*b* may cause a control device associated with the second media playback system 600*b* to display an indication of the playback session. As noted above, the control device of the second media playback system 600*b* might additionally or alternatively receive the indication directly from the computing device 640. The displayed indication on the control device may take the form of a notification, such as "[First Listener] has started a playback session—would you like to join?" Additionally or alternatively, the indication might take the form of an icon displayed within a control application running on the control device.

In some embodiments, the second playback device 610*b* might also provide an audible notification of the playback session. For instance, the second playback device 610*b* may be configured by the second listener to play back a particular tone that signifies when a playback session is available to join. Instead, or in addition, the second playback device 610*b* might play back a pre-recorded message audio message announcing the playback session. In some cases, the audio message might be a recording of the first listener introducing the playback session. Other examples are also possible.

Thereafter, the second playback device 610*b* may receive a command to join the playback session. The command may be a button press input at the control device or second playback device 610*b*, or a voice command issued by the second listener and detected by a NMD of the second media playback system 600*b*. In some implementations, the second listener may configure the second playback device 610*b* to automatically execute a command to join certain playback sessions whenever an indication is received.

At step 751*i*, the second playback device 610*b* transmits to the computing device 640 a request to join the playback session. In some cases, the request to join the playback session may include credentials, such as the second listener's media playback system user account name and/or a passcode corresponding to the playback session. In response, at step 751*j*, the computing device 640 transmits indications of one or more media items and a playback position within the one or more media items to the second playback device 610*b*. In some implementations, the computing device 640 may indicate the same one or media items and playback position that it received from the first playback device 610*a*. In some situations, however, the second playback device 610*b* might request to join the playback session after the playback session has already been active for some time. Accordingly, the computing device 640 may send one or more media items corresponding to what is currently being played back by the first playback device 610*a*.

In this regard, the computing device 640 may update the indication of the playback position after it is initially received from the first playback device 610*a*. For example, if the computing device receives a request to join the playback session 90 seconds after it initially received the indication of the playback position from the first playback device 610*a*, the computing device may provide, to the second playback device 610*b*, the indication of the one or more media items as well as an indication of the playback position that is advanced by 90 second from the initial indication received by the computing device 640. In some embodiments, to facilitate the computing device 640 maintaining an indication of the playback position that is relatively accurate, the first playback device 610*a* may provide periodic updates of its playback position to the computing device 640, as discussed below.

In some implementations, the computing device 640 might provide to the second playback device 610b an indication of all media items that it has received from the first playback device 610a. In some cases, as noted above, this may include an indication of all media items in the playback queue of the first playback device 610a. Alternatively, the computing device 640 might provide an indication of fewer than all of the media items for which it has received an indication from the first playback device 610a. For instance, in an implementation where the computing device 640 has received an indication from the first playback device 610a of every media item in the playback queue, the computing device 640 might nonetheless only send an indication of fewer than every media item to the second playback device 610b. As noted above, this approach may be desirable in some situations, to reduce the size and quantity of data transmissions that must be exchanged between devices, among other possible benefits.

As shown in FIG. 7A, the second playback device 610b in the second media playback system 600b may have access to the same first media service 641a to which the first playback device 610a in the first media playback system 600a has access. In this scenario, the second playback device 610b may retrieve the one or more media items from the first media service 641a. For example, the indication of the one or more media items from the first playback device 610a may include identifiers that are specific to the first media service 641a that is used by the first media playback system 600a.

Accordingly, at step 751k, the second playback device 610b may use the media service-specific identifiers to request the one or more media items from the first media service 641a. In response, at step 751n the first media service 641a may transmit, and the second playback device 610b may receive, the one or more media items.

At step 751h, the second playback device 610b may play back the one or more media items, beginning from the playback position based on the indication provided by the computing device 640. In this way, the second listener may join the playback session in substantial synchrony with the first listener, enabling a shared listening experience.

In the examples discussed above, the first playback device 610a begins playback of media items in the playback queue before initiating sharing of the playback session. However, the steps shown in FIG. 7A need not proceed in the order shown. For example, in some embodiments, the first listener might initiate sharing of the of the playback session before playback has begun, or perhaps while playback of media items from the playback queue is paused. Moreover, in some embodiments, the playback queue might even be empty, if the first listener has not added any media items yet. In these situations, the first playback device 610a may transmit to the computing device 640 an initial indication of the playback session that does not include an indication of any media items or a playback position.

The computing device 640 may transmit an initial indication of the playback session to the second playback device 610b, which may then request to join the playback session, as discussed above. Thereafter, once playback begins at the first playback device 610a, the indications of the one or more media items and the playback position may be transmitted, as noted in the examples above.

In some embodiments, as mentioned above, the first playback device 610a may provide the computing device 640 with occasional updates to the indication of the playback position. This is depicted in FIG. 7A at step 751p and may take place at any time during a playback session. For example, the first playback device 610a may provide the computing system 640 with an update to the playback position any time that the first playback device 610a transmits an indication of a playback queue update. Additionally, the first playback device 610a may be configured to transmit an update to the playback position if a predetermined time has passed since the last update was provided. For example, if five minutes, or some other time period passes without the first playback device 610a updating the computing device 640 with a playback position, the first playback device 610a will transmit such an update.

In response, for each indication of an updated playback position that the computing device 640 receives, it may transmit, at step 751q, an indication of the updated playback position to the second playback device 610b. Other examples are also possible.

In some implementations, the second playback device 610b may determine that it is currently playing back a given media item at a given playback position that differs from the indicated playback position provided by the computing device 640. For instance, the second playback device 610b may determine that a difference between its own playback position and the indicated playback position exceeds a threshold, such as 5 seconds. Other thresholds are also possible. The second computing device 610b may transmit an indication of the difference to the computing device 640. Alternatively, the second playback device 610b may send an indication of its own playback position to the computing device 640, and the computing device 640 may determine that a playback timing difference between the playback positions of the first and second playback devices exceeds the threshold.

In response, the computing device 640 may undertake steps to reduce the playback timing difference. For example, if playback by the second playback device 610b is trailing the first playback device 610a, the computing device 640 may facilitate inserting a short time delay, such as one second, in between media items that are played back by the first playback device 610a. Such a delay may also be inserted when any transport controls are executed by the first playback device 610a. Additionally or alternatively, the first playback device 610a may facilitate a playback timing correction based on an indication received from the computing device 640 that one or more other participating playback devices are falling too far behind the playback position of the first playback device 610a.

A playback timing correction might take other forms as well. In some implementations, one or more devices may timestretch the audio content to be played back, or a portion thereof, to increase or decrease its tempo without changing its pitch. For example, the second playback device 610b may adjust the audio content of one or more media items that it receives from a given media service in order to increase the tempo of playback. Further, the first playback device 610a may additionally or alternatively timestretch the audio content of one or more received media items to decrease the tempo of playback, and thereby gradually reduce the difference in playback position between the two devices.

In some embodiments, the computing device 640 may provide the one or more media items to the playback devices in a shared playback session. For example, the computing device 640 may operate similar to the music services 433g discussed above, assembling and curating playlists, internet radio content, recordings of prior playback sessions, among other possibilities. In such embodiments, the computing device 640 may undertake the timestretching of audio content discussed above, before transmitting the adjusted audio content to the first playback device 610 and/or the second playback device 610b for playback. Other examples for reducing or correcting for playback timing difference between participating playback devices are also possible.

Figure 7B:
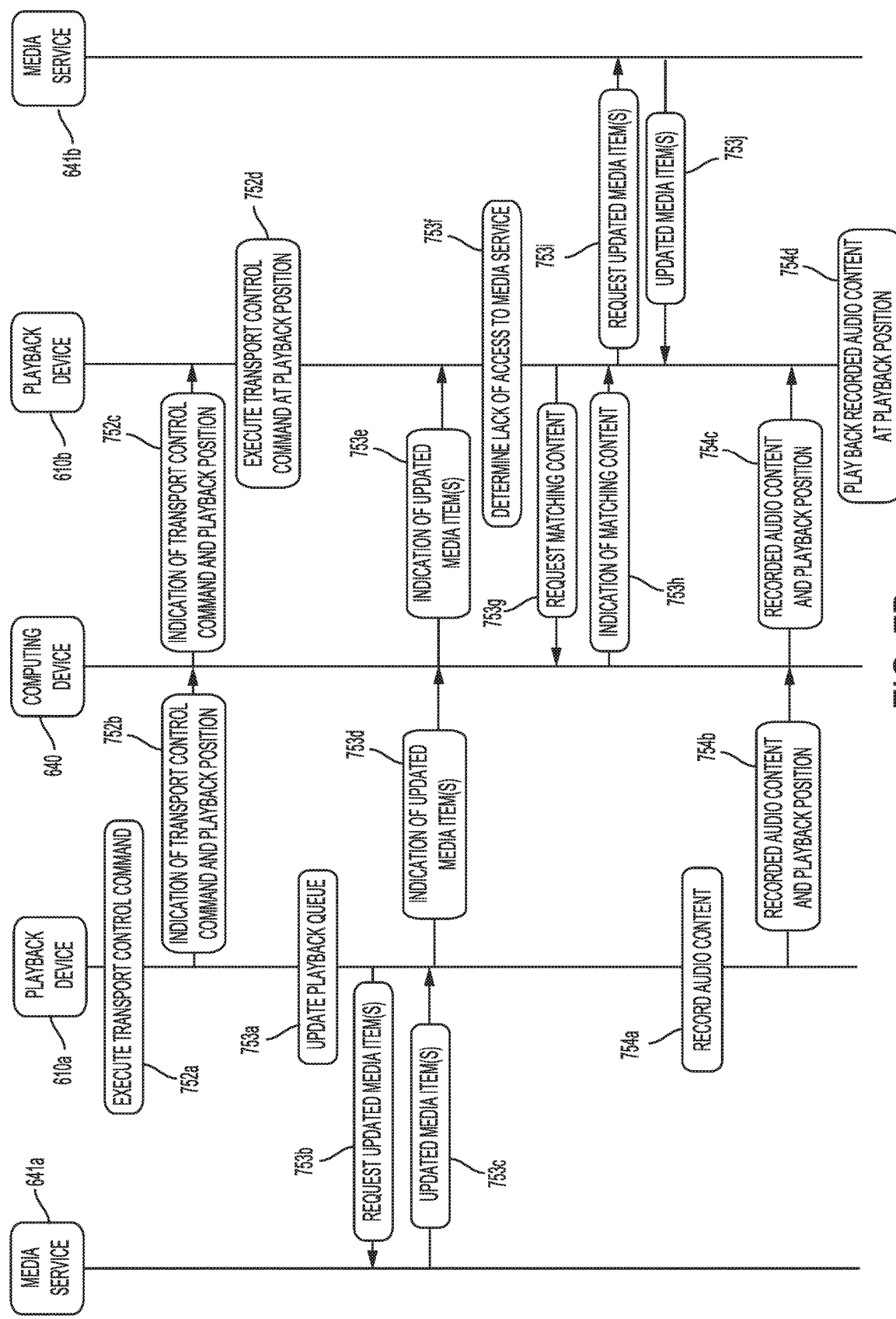
FIG. 7B is another message flow diagram involving a computing device, two playback devices, and two media services.

FIG. 7B is a message flow diagram illustrating additional examples of data exchanges between the various devices shown in FIGS. 6 and 7A. In the examples shown in FIG. 7B, the second playback device 610b has already joined the initiated playback session and is playing back media items in substantial synchrony with the first playback device 610a.

As noted above, the shared playback sessions discussed herein may be controlled by the first listener who initiates the playback session via the first playback device 610a. The control by the first listener might include issuing transport controls to manipulate playback of the one or more media items during the playback session. For example, the first listener might be sharing a playlist with one or more friends, and may choose to skip over a media item. As another example, the first listener might be providing commentary, as discussed in the examples below, that corresponds to the media content that is being played in the playback session. In such cases, it may be beneficial to briefly pause playback while providing the commentary.

Accordingly, at step 752a, the first playback device 610a may execute a transport control command, which may in turn cause an update to the playback position of the first playback device 610a. For example, a command to skip to the next track may advance the playback position to the beginning of the next media item in the playback queue. In some embodiments, the transport control command may be received from the first listener via a control device or via an interface on the first playback device 610a. The transport control command might also be a voice command issued by the first listener and received by a NMD of the first media playback system 600a. Other examples are also possible.

At step 752b, the first playback device 610a transmits indications of the transport control command and the playback position to the computing device 640. For instance, the indication of a command to skip to the next track may be accompanied by an indication of a playback position corresponding to the beginning of the next media item. Alternatively, an indication of a transport control command to pause playback by the first playback device 610a may be accompanied by an indication of the playback position at which playback was paused. Based on the indication of the command, the computing device 640 may discontinue updating the playback position, as noted in the examples above, until it receives an indication of another transport control command that resumes playback at the first playback device 610a. Other examples are also possible.

At step 752c, the computing system may transmit indications of the transport control command and the playback position to the second playback device 610b. At step 752d, based on the received indications, the second playback device may then execute the transport control command.

As noted above, the order of the steps shown in FIG. 7B need not proceed in the exact order shown. For instance, steps 752a and 752b might occur at substantially the same time. In other examples, the first playback device 610a that has initiated sharing of a playback session may be configured execute transport control commands on a delay of, for example, one second. During the brief delay, the first playback device 610a may transmit an indication of the transport controls and the playback position to the computing device 640, which may allow the second playback device 610b and any other participating playback devices to receive the indication and execute the command in substantial synchrony with the first playback device 610a.

Further, in some examples the second listener may also be authorized, by the first listener, for instance, to cooperatively control the playback of media content of the playback session by issuing transport control commands. Such transport control commands issued by the second listener may be propagated to the first listener in the same manner as discussed above.

The authorization for cooperative playback control of the media content may have different permission levels. For example, one level of access may authorize listeners to manipulate the playback queue by adding, removing, or re-ordering the media items in the playback queue. Another level of access may authorize listeners to issue transport controls, or a subset of transport controls, or to provide spoken commentary during the playback session. A given listener of a playback session may be authorized with one or more of the permissions above, among other possibilities.

In some implementations, as shown in FIG. 7B, the second playback device 610b might retrieve media items from a different media service than the first playback device 610a. For example, the second listener might subscribe to a different set of media services than the first listener. In these situations, the computing device 640 may facilitate the playback session according to the following example.

At step 753a, the first playback device 610a may update the playback queue. For instance, the update to the playback queue may be based on a command from the first listener to add one or more updated media items to the playback queue. As noted above, the command from the first listener may be issued as a voice command or an input at a control device of the first media playback system 600a. Other queue updates are also possible.

At step 753b, the first playback device 610a may request the one or more updated media items from the first media service 641a. At step 753c, the first playback device 610a may receive the one or more updated media items from the first media service 641a.

At step 753d, the first playback device 610a may then transmit to the computing device 640 an indication of the one or more updated media items. In some embodiments, an indication of the playback position of the first playback device 610a might also be transmitted to the computing device 640. At step 753e, the computing device 640 may responsively transmit an indication of the one or more updated media items to the second playback device 610b.

At step 753f, the second playback device 610b may determine that it lacks access to the first media service 641a from which the first playback device 610a received the one or more updated media items. For example, as noted above, the indication of the one or more updated media items may include a media service-specific identifier used to retrieve media items from the first media service 641a. Thus, the indication of the one or more updated media items might not be usable by the second playback device 610b for retrieving the one or more updated media items from a different media service to which the second listener does have access.

Therefore, at step 753g, the second playback device 610b may request matching content from the computing device 640. The computing device 640 may then determine, based on the media services that are available to the second media playback system 600b, an indication of matching media content that corresponds to the one or more updated media items. For example, the computing device 640 may determine an indication of matching content that includes an identifier for retrieving the media items from the second media service 641b, to which the second playback device 610b does have access. At step 753h, the computing device 640 transmits the indication of matching media content to the second playback device 610b.

At step 753i, the second playback device 610b may request the one or more updated media items from the second media service 641b using the matching media content. At step 753j the second playback device 610b receives the one or more updated media items from the second media service 641b.

In some embodiments, the computing device 640 may determine, before sending the indication of the one or more updated media items to the second playback device 610b, that the second playback device 610b does not have access to the first media service 641a. For instance, the computing device 640 might make this determination upon receiving the one or more updated media items from the first playback device 610a. Accordingly, the computing device 640 may determine matching content for the second playback device 610b in advance of playback.

In further examples, the computing device 640 might provide an indication of a given media item that includes both a music service-specific identifier and well as generic media item metadata (e.g., a song name, artist name, etc.) that that second playback device 610b may use to locate and retrieve the media item. For example, if the second playback device 610b determines that it does not have access to the music service that matches the music service-specific identifier provided by the computing device 640, the second playback device 610b may use the generic media item metadata to look up the media item on a service to which it does have access, and then retrieve the media item therefrom.

In some implementations, the computing device 640 may facilitate additional shared experiences between the listeners that are participating in a given playback session. For example, as noted above, the first listener might provide commentary during a playback session that the computing device 640 may overlay on the media content that is played.

Accordingly, at step 754a, the first playback device 610a may record, via an integrated NMD, audio content (e.g., the first listener's speech) at a particular playback position during the playback session. In some implementations, the NMD might be separately located from the first playback device 610a in the first media playback system 600a. For instance, a control device of the first media playback system 600a, such as the first listener's smartphone, might act as the NMD for recording the audio content. Further, the control device might include a button or a similar selectable indication that toggles the NMD between a state in which it records audio content during the playback session, and a state in which it does not.

At step 754b, the first playback device 610a may transmit the recorded audio content and an indication of the particular playback position to the computing device 640. At step 754c, the computing device 640 may transmit the recorded audio content and an indication of the particular playback position to the second playback device 610b.

At step 754d, the second playback device 610b plays back the recorded audio content at the particular playback position. In this way, the second listener may experience both the media items selected by the first listener for inclusion in the playback queue as well as the first listener's commentary provided during the playback session.

In some implementations, the playback session may be configured for two-way communication between the first and second listeners. For example, the first listener might select a setting that authorizes the second listener to provide recorded audio during the playback session via a NMD of the second media playback system 600b. This may allow the first and second listeners to converse with each other during the playback session, among other possibilities.

As noted above, data related to a given playback session may be recorded by the computing device 640 for access by listeners at a later time. Such a recording may include indications of the media items that were played back and the playback position of any transport controls that were executed, for example. Further, the computing device 640 may maintain a recording of any commentary that was provided during the playback session, in conjunction with the corresponding playback position(s) at which it was overlaid on the one or more media items during playback. In this way, the playback session can be recreated for a given listener regardless of what music service the listener uses to access the media items for playback.

In some examples, the computing device 640 may record overlaid commentary for multiple media items during a given playback session. The computing device 640 may further associate the overlaid commentary with the individual media items independent of their playback during the playback session. For example, a given listener might be listening to music outside the context of the shared playback sessions discussed herein. If the given listener selects a song for which the computing device 640 has recorded commentary, from any previous playback session, the given listener might be presented with a notification that overlaid commentary is available from the host of the playback session in which the commentary originated (e.g., the artist of the song, a different artist who commented on the song, a pop culture influencer, etc.). Accordingly, the given listener might make a selection via a control device to turn on the commentary, and the computing device 640 may overlay the commentary at the corresponding playback position(s) at which it was recorded.

Moreover, it is possible that the computing device 640 may store more than one commentary track for a given song, provided by different hosts of the respective playback sessions during which the commentary was recorded. Accordingly, a given listener may be presented with a choice of commentary tracks, from different persons, that are available for overlay. Other examples are also possible.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A first playback device comprising:
   at least one processor;
   non-transitory computer-readable medium; and
   program instructions stored on the non-transitory computer-readable medium that, when executed by the at least one processor, cause the first playback device to perform functions comprising:
   while operating in a first media playback system, receiving, from a computing device over a wide area network (WAN), an indication that a second playback device operating in a second media playback system has initiated sharing of a playback session;
   transmitting, to the computing device over the WAN, a request to join the playback session;
   receiving, from the computing device over the WAN, playback session information comprising indications of (i) one or more media items in a queue designated for playback by the second playback device and (ii) a playback position of the second playback device within the one or more media items;
   retrieve, from a media service, the one or more media items in the queue designated for playback by the second playback device;
   playing back the one or more media items beginning at the playback position;
   while playing back a given media item of the one or more media items, receiving, from the computing device over the WAN, (i) audio content recorded by a network microphone device of the second media playback system at a particular time during the first playback session and (ii) an indication of a given playback position in the given media item corresponding to the particular time; and
   playing back the audio content at the given playback position in the given media item.

2. The playback device of claim 1, further comprising program instructions stored on the non-transitory computer-readable medium that, when executed by the at least one processor, cause the playback device to perform functions comprising:
   receiving, from the computing device over the WAN, an indication of (i) a transport control command corresponding to a transport control of the second playback device and (ii) a given playback position within the one or more media items for executing the transport control; and
   executing the transport control command at the given playback position within the one or more media items.

3. The playback device of claim 2, wherein the transport control command comprises a command to begin playback of the or more media items from the given playback position.

4. The playback device of claim 2, wherein the transport control command comprises a command to skip a given media item by (i) discontinuing playback of the given media item at the given playback position and (ii) beginning playback of a next media item at a beginning of the next media item.

5. The playback device of claim 1, further comprising program instructions stored on the non-transitory computer-readable medium that, when executed by the at least one processor, cause the playback device to perform functions comprising:
   receiving, from the computing device over the WAN, an indication that the first playback device is authorized to update the playback session by (i) updating the queue of one or more media items and (ii) issuing transport control commands; and
   after receiving the indication that the first playback device has been authorized to update the playback session, sending a command to update the playback session to the computing device over the WAN.

6. The playback device of claim 5, wherein the command to update the playback session comprises a command to add a media item to the queue of one or more media items.

7. The playback device of claim 5, wherein the command to update the playback session comprises (i) an indication of a pause command to pause playback of the one or more media items and (ii) an indication of a given playback position within the one or more media items for executing the pause command.

8. The playback device of claim 1, further comprising program instructions stored on the non-transitory computer-readable medium that, when executed by the at least one processor, cause the playback device to perform functions comprising:
   while playing back the one or more media items, recording, via a network microphone device of the first media playback system, audio content at a particular time corresponding to a particular playback position in the queue of one or more media items corresponding to the particular time; and
   sending, to the computing device over the WAN, (i) the recorded audio content and (ii) an indication of the particular playback position.

9. The playback device of claim 1, further comprising program instructions stored on the non-transitory computer-readable medium that, when executed by the at least one processor, cause the playback device to perform functions comprising:
  determining that the indication of the one or more media items corresponds to a second media service to which the first playback device does not have access;
  sending a request to the computing device over the WAN for a matching indication of the one or more media items corresponding to a first media service to which the first playback device does have access; and
  receiving, from the computing device over the WAN, the matching indication of the one or more media items corresponding to the first media service, wherein retrieving the one or more media items comprises retrieving the one or more media items from the first media service.

10. A non-transitory computer-readable medium, wherein the non-transitory computer-readable medium is provisioned with program instructions that are executable to cause a first playback device to perform functions comprising:
  while operating in a first media playback system, receiving, from a computing device over a wide area network (WAN), an indication that a second playback device operating in a second media playback system has initiated sharing of a playback session;
  transmitting, to the computing device over the WAN, a request to join the playback session;
  receiving, from the computing device over the WAN, playback session information comprising indications of (i) one or more media items in a queue designated for playback by the second playback device and (ii) a playback position of the second playback device within the one or more media items;
  retrieving, from a media service, the one or more media items in the queue designated for playback by the second playback device;
  playing back the one or more media items beginning at the playback position;
  while playing back a given media item of the one or more media items, receiving, from the computing device over the WAN, (i) audio content recorded by a network microphone device of the second media playback system at a particular time during the first playback session and (ii) an indication of a given playback position in the given media item corresponding to the particular time; and
  playing back the audio content at the given playback position in the given media item.

11. The non-transitory computer-readable medium of claim 10, wherein the non-transitory computer-readable medium is also provisioned with program instructions that are executable to cause the first playback device to perform functions comprising:
  receiving, from the computing device over the WAN, an indication of (i) a transport control command corresponding to a transport control of the second playback device and (ii) a given playback position within the one or more media items for executing the transport control; and
  executing the transport control command at the given playback position within the one or more media items.

12. The non-transitory computer-readable medium of claim 11, wherein the transport control command comprises a command to begin playback of the or more media items from the given playback position.

13. The non-transitory computer-readable medium of claim 11, wherein the transport control command comprises a command to skip a given media item by (i) discontinuing playback of the given media item at the given playback position and (ii) beginning playback of a next media item at a beginning of the next media item.

14. The non-transitory computer-readable medium of claim 10, wherein the non-transitory computer-readable medium is also provisioned with program instructions that are executable to cause the first playback device to perform functions comprising:
  receiving, from the computing device over the WAN, an indication that the first playback device is authorized to update the playback session by (i) updating the queue of one or more media items and (ii) issuing transport control commands; and
  after receiving the indication that the first playback device has been authorized to update the playback session, sending a command to update the playback session to the computing device over the WAN.

15. The non-transitory computer-readable medium of claim 14, wherein the command to update the playback session comprises a command to add a media item to the queue of one or more media items.

16. The non-transitory computer-readable medium of claim 14, wherein the command to update the playback session comprises (i) an indication of a pause command to pause playback of the one or more media items and (ii) an indication of a given playback position within the one or more media items for executing the pause command.

17. The non-transitory computer-readable medium of claim 10, wherein the non-transitory computer-readable medium is also provisioned with program instructions that are executable to cause the first playback device to perform functions comprising:
  determining that the indication of the one or more media items corresponds to a second media service to which the first playback device does not have access;
  sending a request to the computing device over the WAN for a matching indication of the one or more media items corresponding to a first media service to which the first playback device does have access; and
  receiving, from the computing device over the WAN, the matching indication of the one or more media items corresponding to the first media service, wherein retrieving the one or more media items comprises retrieving the one or more media items from the first media service.

18. A method implemented by a first playback device, the method comprising:
  while operating in a first media playback system, receiving, from a computing device over a wide area network (WAN), an indication that a second playback device operating in a second media playback system has initiated sharing of a playback session;
  transmitting, to the computing device over the WAN, a request to join the playback session;
  receiving, from the computing device over the WAN, playback session information comprising indications of (i) one or more media items in a queue designated for playback by the second playback device and (ii) a playback position of the second playback device within the one or more media items;

retrieving, from a media service, the one or more media items in the queue designated for playback by the second playback device;

playing back the one or more media items beginning at the playback position;

while playing back a given media item of the one or more media items, receiving, from the computing device over the WAN, (i) audio content recorded by a network microphone device of the second media playback system at a particular time during the first playback session and (ii) an indication of a given playback position in the given media item corresponding to the particular time; and playing back the audio content at the given playback position in the given media item.

* * * * *